(12) United States Patent
MacMillan et al.

(10) Patent No.: US 12,722,360 B2
(45) Date of Patent: Sep. 1, 2026

(54) METAL COUPON WITH POROUS REGIONS AND SLANTED SIDE WALL(S) FOR TURBOMACHINE COMPONENT

(71) Applicant: GE Infrastructure Technology LLC, Greenville, SC (US)

(72) Inventors: Glen A. MacMillan, Simpsonville, SC (US); Mark Carmine Bellino, Greenville, SC (US); Jesse Keller, Greenville, SC (US); Ellison A. Lenz, Greenville, SC (US); Mark Lawrence Hunt, Greenville, SC (US); Paul Albert Cook, Greenville, SC (US); Nathan Nicholas Ostrout, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 210 days.

(21) Appl. No.: 18/495,818

(22) Filed: Oct. 27, 2023

(65) Prior Publication Data

US 2025/0135751 A1 May 1, 2025

(51) Int. Cl.
*B32B 15/00* (2006.01)
*B32B 15/01* (2006.01)

(52) U.S. Cl.
CPC .................................... *B32B 15/01* (2013.01)

(58) Field of Classification Search
None
See application file for complete search history.

(56) References Cited

U.S. PATENT DOCUMENTS 3,031,996 A 5/1962 Botvin
4,195,764 A 4/1980 Bogart
(Continued)

FOREIGN PATENT DOCUMENTS

CA 2731756 C 4/2016
CN 101626862 A 1/2010
(Continued)

OTHER PUBLICATIONS

Office Action (Non-Final Rejection) dated Jul. 28, 2025 for related U.S. Appl. No. 18/417,625, 16 pages.
(Continued)

*Primary Examiner* — Mary I Omori
(74) *Attorney, Agent, or Firm* — James Pemrick; Charlotte Wilson; Hoffman Warnick LLC

(57) ABSTRACT

An additive manufactured (AM) metal coupon for a turbomachine component is provided. The component includes an airfoil body having a pressure side, a suction side, a trailing edge, and a coupon opening. The AM metal coupon has an AM metal member with at least one slanted coupon side wall at an angle of less than 90° with an exterior surface of the AM metal member. The AM metal member also has a first porous region having a first porosity and a second porous region having a second porosity different than the first porosity. A braze material couples the AM metal coupon in the coupon opening in the airfoil body and infiltrates into at least one of the first porous region based at least on a characteristic of the first porosity and the second porous region based at least on a characteristic of the second porosity.

20 Claims, 16 Drawing Sheets

(56) References Cited

U.S. PATENT DOCUMENTS 5,156,321 A 10/1992 Liburdi et al.
5,511,721 A 4/1996 Demo et al.
5,775,402 A 7/1998 Sachs et al.
6,199,746 B1 3/2001 Dupree et al.
6,413,650 B1 * 7/2002 Dupree .................. B23P 6/005 428/596
6,530,280 B2 3/2003 Schmermund
7,635,078 B2 12/2009 Ariga et al.
8,042,723 B2 10/2011 Holi
9,873,171 B2 1/2018 Li et al.
10,006,293 B1 6/2018 Jones
10,228,138 B2 3/2019 Theuer et al.
10,384,787 B2 8/2019 Gordon et al.
10,456,849 B2 10/2019 Eminoglu
10,767,489 B2 9/2020 Bunker
10,975,719 B2 4/2021 Ucok et al.
11,001,002 B2 5/2021 Kulinsky
11,577,317 B2 2/2023 Hart et al.
11,712,738 B2 8/2023 Ozbaysal et al.
2004/0134887 A1 7/2004 Murphy
2007/0084047 A1 4/2007 Lange et al.
2009/0229101 A1 9/2009 Ahmad
2010/0239412 A1 9/2010 Draper
2011/0099810 A1 * 5/2011 Stankowski ............ F01D 5/005 29/888
2011/0180589 A1 7/2011 Tuppen et al.
2012/0003086 A1 1/2012 Morris et al.
2013/0086785 A1 4/2013 Cui et al.
2013/0104397 A1 5/2013 Bunker
2013/0108460 A1 5/2013 Szwedowicz et al.
2013/0115091 A1 * 5/2013 Bruck .................... F01D 5/005 416/223 R
2014/0020823 A1 1/2014 Montross
2014/0072448 A1 3/2014 Prue et al.
2014/0111956 A1 4/2014 Taniguchi
2014/0259666 A1 9/2014 Baughman et al.
2014/0321994 A1 10/2014 Brzek
2014/0329043 A1 11/2014 Shigetomi
2015/0093566 A1 4/2015 Bell
2015/0111060 A1 * 4/2015 Kottilingam .......... C22C 19/058 428/608
2015/0147164 A1 5/2015 Cui et al.
2015/0283642 A1 10/2015 Forsdike et al.
2016/0059364 A1 3/2016 Huxol
2016/0090848 A1 3/2016 Engeli et al.
2016/0115571 A1 4/2016 Kestler et al.
2016/0214176 A1 7/2016 Bruck et al.
2016/0325368 A1 11/2016 Landwehr et al.
2017/0029088 A1 2/2017 Gruner
2017/0108216 A1 4/2017 Taniguchi et al.
2017/0284206 A1 10/2017 Roberts
2017/0328207 A1 11/2017 Bunker
2018/0010457 A1 1/2018 Chabane et al.
2018/0010458 A1 1/2018 Chabane et al.
2018/0023403 A1 1/2018 Jones et al.
2018/0161902 A1 6/2018 Cui et al.
2018/0180329 A9 6/2018 Conrad et al.
2018/0187564 A1 7/2018 Cui et al.
2018/0200817 A1 7/2018 Henderson et al.
2018/0320270 A1 11/2018 Nardi
2018/0339354 A1 11/2018 Eminoglu et al.
2018/0345415 A1 12/2018 Whims
2019/0054567 A1 2/2019 Roerig et al.
2019/0284942 A1 9/2019 Tanigawa et al.
2019/0329344 A1 10/2019 Eminoglu et al.
2019/0345826 A1 11/2019 Packer et al.
2020/0047253 A1 2/2020 Thomas et al.
2020/0072078 A1 3/2020 Decesare et al.
2020/0149403 A1 5/2020 Kottilingam et al.
2020/0149407 A1 * 5/2020 Kottilingam ............ F01D 9/065
2020/0254547 A1 8/2020 Puidokas et al.
2020/0254548 A1 8/2020 Xu et al.
2020/0384560 A1 * 12/2020 Rebbecchi, Jr. ......... B23K 1/20
2021/0114110 A1 4/2021 Sercombe et al.
2021/0146459 A1 5/2021 Gold et al.
2021/0146485 A1 5/2021 Bulgrin et al.
2021/0154956 A1 5/2021 Schubel et al.
2021/0246534 A1 8/2021 Cui et al.
2022/0136395 A1 5/2022 Ozbaysal et al.
2022/0234101 A1 7/2022 Ozbaysal et al.
2022/0333494 A1 10/2022 Subramanian et al.
2022/0347928 A1 11/2022 Truxel et al.
2022/0402031 A1 12/2022 Hann et al.
2023/0145370 A1 5/2023 Dyson
2024/0082919 A1 3/2024 Daulton et al.
2024/0082938 A1 3/2024 Daulton et al.
2024/0082939 A1 3/2024 Daulton et al.
2025/0135533 A1 5/2025 Salm et al.
2025/0135545 A1 5/2025 Pemrick et al.
2025/0135566 A1 5/2025 Simpson et al.
2025/0135567 A1 5/2025 Simpson et al.
2025/0135588 A1 5/2025 Salm et al.
2025/0135749 A1 5/2025 Simpson et al.
2025/0135751 A1 5/2025 Macmillan et al.
2025/0137373 A1 5/2025 Dozier et al.
2025/0137387 A1 5/2025 Hunt et al.

FOREIGN PATENT DOCUMENTS

CN 108393648 A 8/2018
CN 113430414 A 9/2021
CN 116532909 A 8/2023
CN 119489203 A 2/2025
CN 119604401 A 3/2025
CN 119897464 A 4/2025
CN 119897467 A 4/2025
CN 119897480 A 4/2025
CN 119897481 A 4/2025
DE 102014224410 A1 6/2016
DE 102018218017 A1 4/2020
EP 1074331 A1 2/2001
EP 1127648 A2 8/2001
EP 2078579 A1 7/2009
EP 2450471 A1 5/2012
EP 3360637 A1 8/2018
EP 3508686 A1 7/2019
EP 3693115 A1 8/2020
EP 4545208 A2 4/2025
EP 4545209 A1 4/2025
EP 4545212 A1 4/2025
EP 4545218 A1 4/2025
JP 2022542180 A 9/2022
TW 1670166 B 9/2019
WO 2020014677 A1 1/2020
WO 2020145971 A1 7/2020
WO 2021247970 A1 12/2021

OTHER PUBLICATIONS

Office Action (Final Rejection) dated Aug. 8, 2025 for related U.S. Appl. No. 18/495,816, 15 pages.

Notice of Allowance and Fees Due dated Aug. 5, 2025 for related U.S. Appl. No. 18/495,817, 9 pages.

Office Action (Non-Final Rejection) dated Aug. 11, 2025 for related U.S. Appl. No. 18/495,809, 13 pages.

Office Action (Non-Final Rejection) dated Aug. 12, 2025 for related U.S. Appl. No. 18/495,810, 14 pages.

EP Search Report for EP Application No. 24223562.0, dated Jul. 8, 2025, 7 pages.

Non-Final Office Action issued in U.S. Appl. No. 18/495,803, dated Nov. 14, 2024, 26 pages.

EP Search Report for EP Application No. 24204162.2, dated Mar. 14, 2025, 11 pages.

Final Office Action for related U.S. Appl. No. 18/495,803, dated Mar. 19, 2025, 26 pages.

Non-Final Office Action dated Apr. 21, 2025 for related U.S. Appl. No. 18/495,816, 29 pages.

EP Search Report for EP Application No. 24204157.2, dated Mar. 14, 2025, 11 pages.

EP Search Report for EP Application No. 24204160.6, dated Apr. 16, 2025, 12 pages.

(56) References Cited

OTHER PUBLICATIONS

EP Search Report for EP Application No. 24204462.6, dated Apr. 1, 2025, 10 pages.
EP Search Report for EP Application No. 24204155.6, dated Apr. 2, 2025, 10 pages.
EP Search Report for EP Application No. 24204158.0, dated Mar. 19, 2025, 10 pages.
EP Search Report for EP Application No. 24204153.1, dated Mar. 3, 2025, 11 pages.
EP Search Report for EP Application No. 24204463.4, dated Apr. 22, 2025, 10 pages.
EP Search Report for EP Application No. 24204461.8, dated Mar. 14, 2025, 11 pages.
EP Search Report for EP Application No. 24204154.9, dated Mar. 19, 2025, 13 pages.
EP Search Report for EP Application No. 24204161.4, dated Mar. 14, 2025, 14 pages.
EP Search Report for EP Application No. 24204156.4, dated Mar. 18, 2025, 13 pages.
Non-Final Office Action dated May 9, 2025 for related U.S. Appl. No. 18/495,808, 16 pages.
Office Action (Final Rejection) dated Sep. 26, 2025 for related U.S. Appl. No. 18/495,808, 17 pages.
EP Search Report for EP Application No. 24223553.9, dated Nov. 17, 2025, 9 pages.
Glossary of Metallurgical and Metalworking Terms, ASM Handbook, 1998 (Year: 1998), pp. 1 and 52.
Office Action (Non-Final Rejection) dated Dec. 17, 2025 for U.S. Appl. No. 18/495,804, 17 pages.
Notice of Allowance and Fees Due dated Dec. 9, 2025 for U.S. Appl. No. 18/417,625, 9 pages.
Notice of Allowance and Fees Due dated Dec. 22, 2025 for U.S. Appl. No. 18/495,807, 8 pages.
Office Action (Non-Final Rejection) dated Nov. 24, 2025 for U.S. Appl. No. 18/495,816, 22 pages.
Office Action (Final Rejection) dated Dec. 31, 2025 for U.S. Appl. No. 18/495,809, 13 pages.
Office Action (Non-Final Rejection) dated Jan. 8, 2026 for U.S. Appl. No. 18/495,812, 9 pages.
Notice of Allowance and Fees Due dated Dec. 31, 2025 for U.S. Appl. No. 18/495,810, 11 pages.
Notice of Allowance and Fees Due dated Jan. 21, 2026 for U.S. Appl. No. 18/495,808, 10 pages.

* cited by examiner

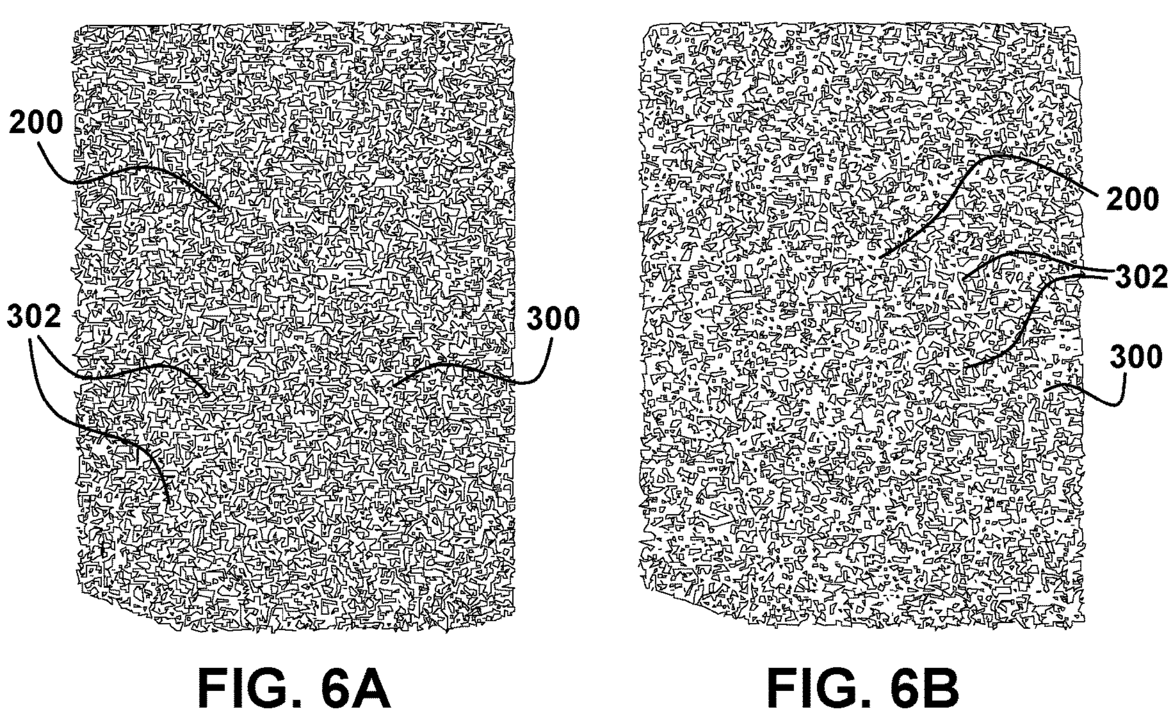
FIG. 6A
FIG. 6B
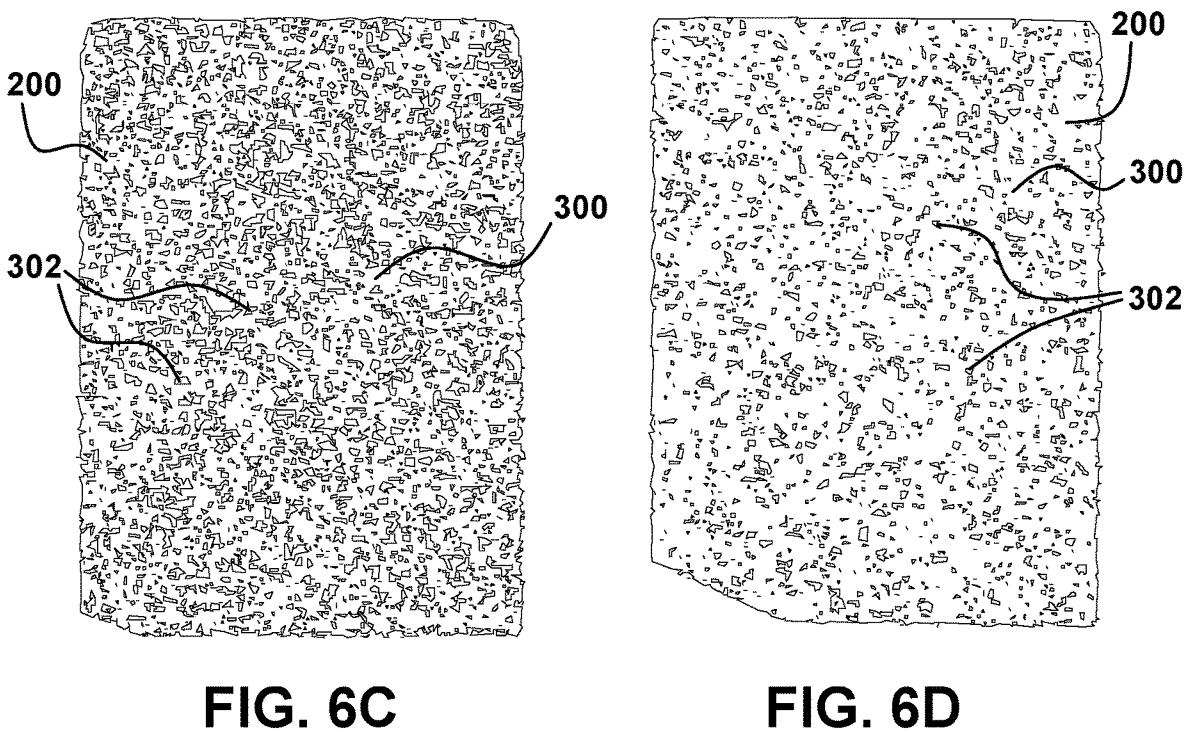
FIG. 6C
FIG. 6D

METAL COUPON WITH POROUS REGIONS AND SLANTED SIDE WALL(S) FOR TURBOMACHINE COMPONENT

TECHNICAL FIELD

The disclosure relates generally to component repair and manufacture, and more specifically, to a turbomachine component using a metal coupon with two porous regions and slanted side wall(s).

BACKGROUND

Industrial components occasionally require repair. For example, hot gas path components that are used in turbomachines to direct a working fluid to create energy may require repair. Hot gas path components can take a variety of forms, such as turbine rotating blades or stationary vanes, that include airfoils that direct a working fluid to create energy. Rotating blades are coupled to and act to turn a turbine rotor, and stationary vanes are coupled to a casing of the turbomachine to direct the working fluid towards the rotating blades.

Additive manufacturing, such as direct metal laser melting (DMLM) or selective laser melting (SLM), has emerged as a reliable manufacturing method for making industrial components. The advent of additive manufacturing techniques has also provided the ability to replace sections of components such as part of a leading or trailing edge of a turbomachine nozzle. For example, a portion of a leading edge of a turbomachine nozzle may be removed, leaving a cutout in the nozzle, and a new section (referred to herein as a "coupon") may be coupled in the cutout. The coupon is additively manufactured to have a shape that at least generally matches that of the cutout. The coupon can replace a section of a used turbomachine nozzle or be added as part of a new turbomachine nozzle.

However, replacement coupons are made with the same materials and exterior structure as the removed portion of the component. Consequently, the replacement coupons suffer from some of the same drawbacks as the original component and/or cutout with no improvement to general performance characteristics such as coupon strength, oxidation resistance, cycle fatigue, stress/strain resistance, ductility, wear resistance, thermal or electrical conductivity, and/or decreased mass. A single braze material is used to couple the replacement coupon to the component, which prevents improving the general performance characteristics listed above and additional performance characteristics related to the joint, such as increasing joint adhesive bond strength and reliability, and decreasing required post-braze machining/blending. Using coupons that are materially identical to the removed cutouts also does not allow reduction in the high material cost for the replacement coupons. Another challenge is ensuring long term coupling of the coupon with the same strength as the cutout.

BRIEF DESCRIPTION

All aspects, examples and features mentioned below can be combined in any technically possible way.

An aspect of the disclosure provides a metal coupon, comprising: an additively manufactured (AM) metal member having: at least one slanted coupon side wall at an angle of less than 90° with an exterior surface of the AM metal member; a first porous region having a first porosity; and a second porous region having a second porosity different than the first porosity, wherein the first porosity and the second porosity are between 2% to 50% open space volume to total volume of the first porous region and second porous region, respectively.

Another aspect of the disclosure includes any of the preceding aspects, and the AM metal member includes a variable porosity region between the first porous region and the second porous region.

Another aspect of the disclosure includes any of the preceding aspects, and the AM metal member further includes a slanted end wall at an angle of less than 90° with the exterior surface of the AM metal member.

Another aspect of the disclosure includes any of the preceding aspects, and the first porosity and the second porosity are between 10% to 40% open space volume to total volume of the respective porous region.

Another aspect of the disclosure includes any of the preceding aspects, and the AM metal member includes a cooling passage therein.

An aspect of the disclosure includes a turbomachine component, comprising: an airfoil body having a pressure side, a suction side and a trailing edge; an additively manufactured (AM) metal coupon having oppositely slanted coupon side walls each at an angle of less than 90° with an exterior surface of the AM metal coupon, a first porous region having a first porosity, and a second porous region having a second porosity different than the first porosity; and a braze material coupling the AM metal coupon in a coupon opening in the airfoil body, the braze material infiltrated into at least one of the first porous region based at least on a characteristic of the first porosity and the second porous region based at least on a characteristic of the second porosity, wherein the coupon opening includes mating oppositely slanted coupon side walls to the coupon side walls.

Another aspect of the disclosure includes any of the preceding aspects, and the AM metal coupon further includes a slanted end wall at an angle of less than 90° with the exterior surface of the AM metal coupon, and the coupon opening includes a mating inner wall to the slanted end wall.

Another aspect of the disclosure includes any of the preceding aspects, and the oppositely slanted coupon side walls extend from the pressure side to the suction side of the airfoil body.

Another aspect of the disclosure includes any of the preceding aspects, and the oppositely slanted coupon side walls extend from an upstream end of the metal coupon to the trailing edge of the airfoil body.

Another aspect of the disclosure includes any of the preceding aspects, and the oppositely slanted coupon side walls extend from the pressure side to the suction side of the airfoil body.

Another aspect of the disclosure includes any of the preceding aspects, and the AM metal coupon includes a variable porosity region between and including the first porous region and the second porous region.

Another aspect of the disclosure includes any of the preceding aspects, and the first porosity is higher than the second porosity and the first porous region includes more braze material therein than the second porous region.

Another aspect of the disclosure includes any of the preceding aspects, and the first porous region is in at least part of an edge of the metal coupon configured for joining to the airfoil body, and the second porous region is adjacent to the at least part of the first porous region.

Another aspect of the disclosure includes any of the preceding aspects, and the first porosity and the second porosity are between 2% to 50% open space volume to total volume of the first porous region and second porous region, respectively.

Another aspect of the disclosure includes a method of coupling a metal coupon in a turbomachine component having an airfoil body having a pressure side, a suction side and a trailing edge, the method comprising: additively manufacturing the metal coupon having oppositely slanted coupon side walls each at an angle of less than 90° with an exterior surface of the metal coupon, a first porous region having a first porosity, and a second porous region having a second porosity different than the first porosity; positioning the metal coupon in a coupon opening in the airfoil body of the component, wherein the coupon opening includes mating oppositely slanted coupon side walls to the coupon side walls; and infiltrating the metal coupon with a braze material to couple the metal coupon in the coupon opening in the airfoil body, wherein the infiltrating includes infiltrating the braze material into at least one of the first porous region based at least on a characteristic of the first porosity and the second porous region based at least on a characteristic of the second porosity.

Another aspect of the disclosure includes any of the preceding aspects, and the additive manufacturing includes forming the metal coupon with a slanted end wall at an angle of less than 90° with the exterior surface of the metal coupon, and wherein the coupon opening includes a mating inner wall to the slanted end wall.

Another aspect of the disclosure includes any of the preceding aspects, and the additive manufacturing includes forming the metal coupon with the oppositely slanted coupon side walls extending from the pressure side to the suction side of the airfoil body.

Another aspect of the disclosure includes any of the preceding aspects, and the additive manufacturing includes forming the metal coupon with the oppositely slanted coupon side walls extending from an upstream end of the metal coupon to the trailing edge of the airfoil body.

Another aspect of the disclosure includes any of the preceding aspects, and the additive manufacturing further includes forming the oppositely slanted coupon side walls extending from the pressure side to the suction side of the airfoil body.

Another aspect of the disclosure includes any of the preceding aspects, and further comprising, prior to the additive manufacturing: creating the coupon opening in the airfoil body configured to receive the metal coupon; and creating a model of the coupon opening, wherein the additive manufacturing includes manufacturing the metal coupon based on the model of the coupon opening.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 6A-D show top-down views of sample metal coupons having porous regions having different porosities according to embodiments of the disclosure;

Figure 1:
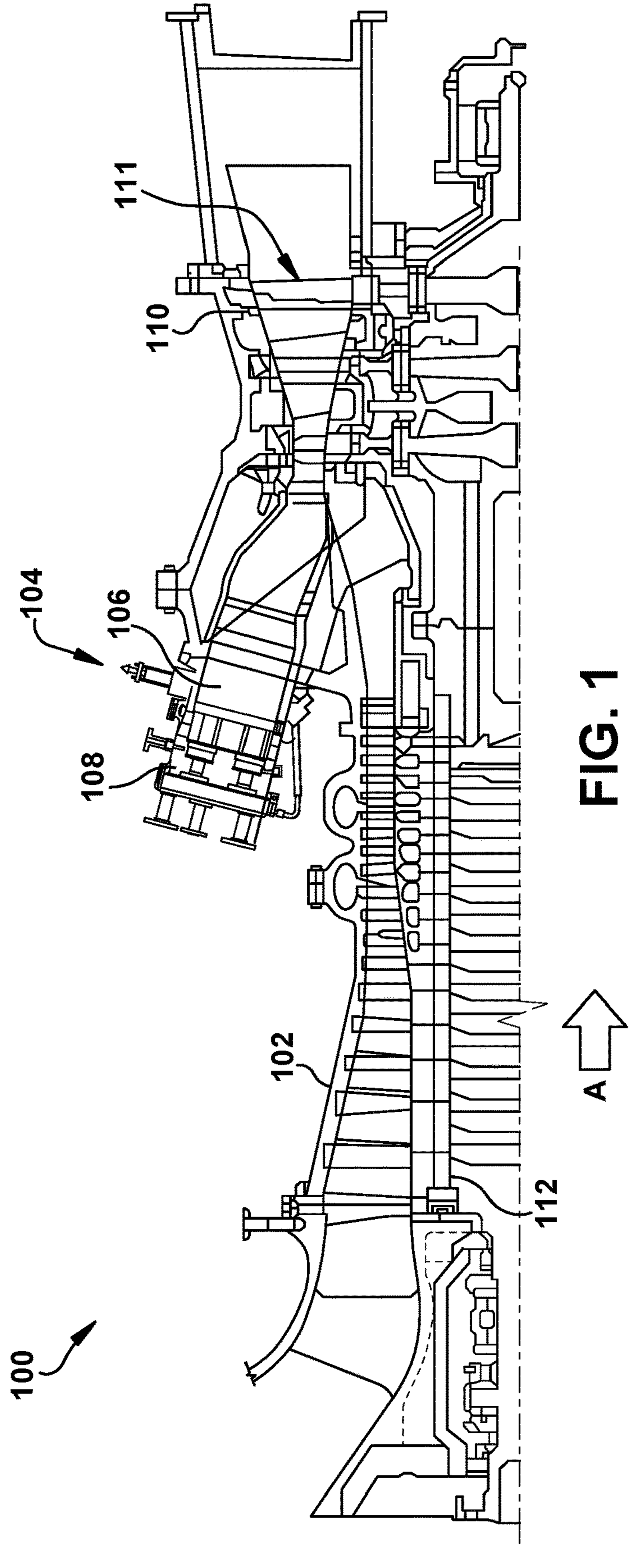
FIG. 1 shows a schematic view of an illustrative turbomachine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a turbomachine component including an airfoil body, and an additively manufactured (AM) metal coupon having at least one slanted coupon side wall at an angle of less than 90° with an exterior surface of the AM metal member. A "coupon" as used herein may include any part configured to be positioned in a coupon opening in a body of the component as part of original manufacture or repair, i.e., it is an insertable part. In certain embodiments, a pair of slanted coupon side walls are at an angle of less than 90° with an exterior surface of the AM metal member. As will be described, the slanted coupon side walls can take a variety of forms to assist in retaining the metal coupon in the turbomachine component. The AM metal coupon also has a first porous region having a first porosity and a second porous region having a second porosity different than the first porosity. The first porosity and the second porosity are between 2% to 50% open space volume to total volume of the first porous region and second porous region, respectively. The turbomachine component includes an airfoil body having a pressure side, a suction side and a trailing edge, and a coupon opening with the AM metal coupon therein. The coupon opening includes mating oppositely slanted coupon side walls to the coupon side walls, e.g., to retain the metal coupon therein. A braze material couples the AM metal coupon in the coupon opening in the airfoil body and infiltrates into at least one of the first porous region based at least on a characteristic of the first porosity and the second porous region based at least on a characteristic of the second porosity. A method of coupling the metal coupon to the component may include additively manufacturing the metal coupon as noted and positioning the metal coupon in the coupon opening in the airfoil body of the turbomachine component.

As noted, the metal coupon may be infiltrated with a braze material to couple the metal coupon in the coupon opening in the airfoil body. The braze material infiltrates into at least one of the first porous region based at least on a characteristic of the first porosity and the second porous region based at least on a characteristic of the second porosity. The porosities of the AM metal coupon are configured to direct the flow of one or more braze materials in different ways to create different physical characteristics than previously possible, e.g., by directing more braze material where needed, directing braze material into special shapes and/or allowing use of more than one braze material. Where used for repair, the customized AM metal coupons do not suffer the same drawbacks as the original component and/or cutout and can be customized (with the braze material(s)) to, for example, change: joint adhesive bond strength, coupon strength, stress/strain resistance, ductility, wear resistance, oxidation resistance, cycle fatigue, thermal conductivity, electrical conductivity, surface roughness, hardness, and mass. The repair is stronger than traditional narrow gap brazing processes, does not require certain post-repair finishing, yet provides improved physical characteristics compared to current techniques, such as pre-sintered preforms (PSPs). One or more braze materials can be used to couple the replacement coupon to the component to also improve performance characteristics related to the joint, such as joint adhesive bond strength and reliability, and reducing required post-brazing machining/blending. Use of the porous AM coupon can also reduce material costs, for example, by using less of the metal coupon's more expensive base material. The slanted coupon side wall(s) leverage the operational loads, e.g., turbomachine aerodynamic loads from pressure differences and drag, to retain the metal coupon within the component, e.g., nozzle or blade trailing edge.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
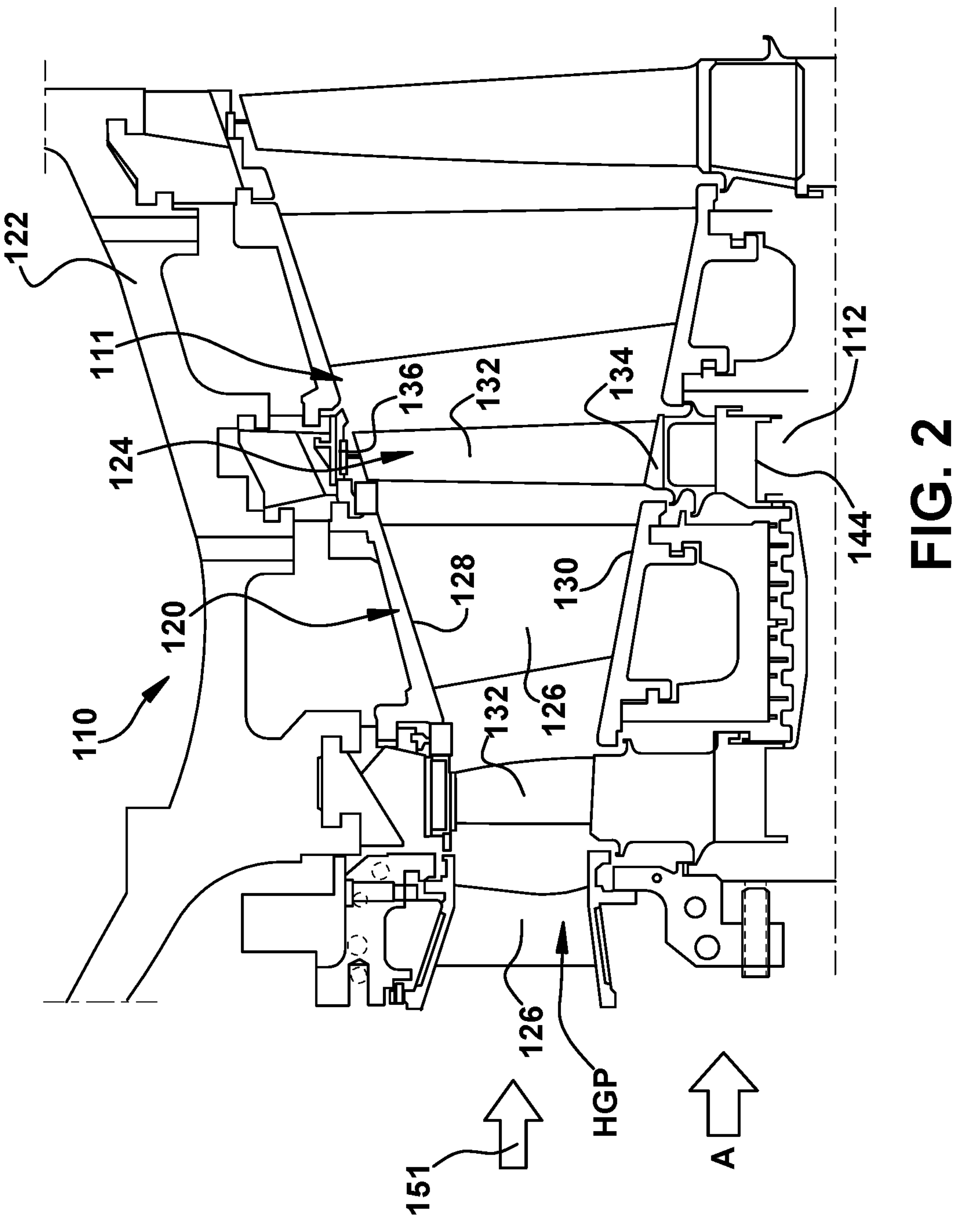
FIG. 2 shows a cross-sectional view of an illustrative gas turbine assembly that may be used with the gas turbine system in FIG. 1 and including a turbomachine component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 148 (at root of blade, FIG. 3) coupled to rotor 112 and, optionally, a radially outward tip shroud 136 (at tip of blade). As used herein, the term "component" or "turbomachine component" may refer collectively to stationary nozzles 126, rotating blades 132 or any other structure in which metal coupons including porous region(s) according to the disclosure can be employed.

Figure 3:
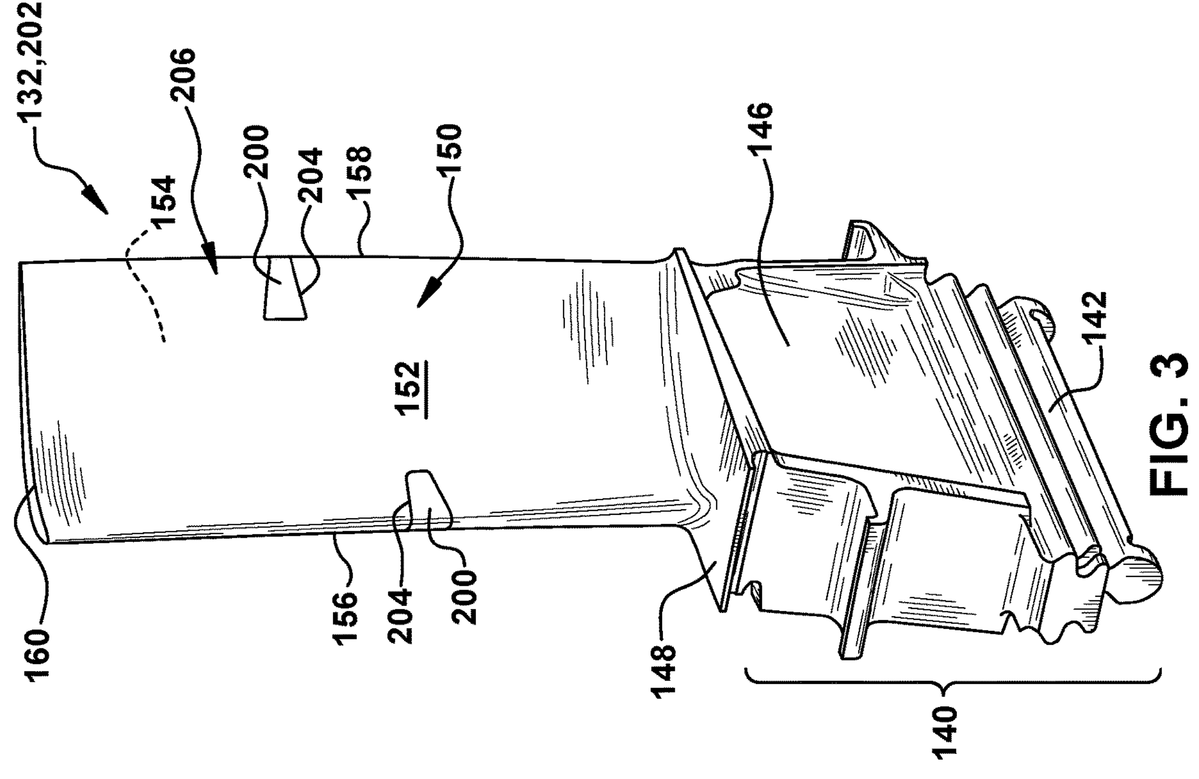
FIG. 3 shows a perspective view of a turbomachine component in the form of a turbine rotating blade including a metal coupon according to embodiments of the disclosure.
Figure 4:
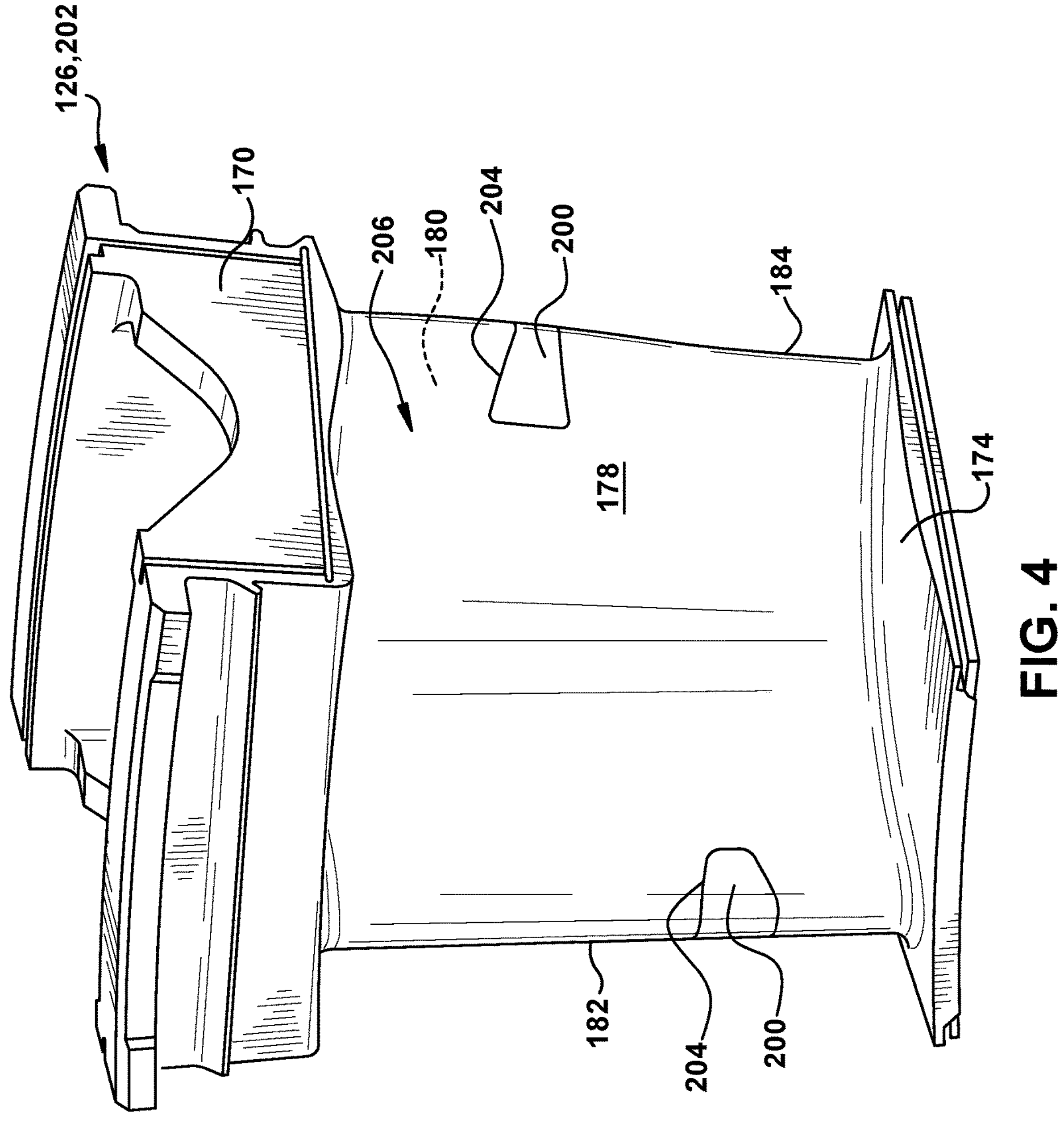
FIG. 4 shows a perspective view of a turbomachine component in the form of a turbine nozzle including a metal coupon according to embodiments of the disclosure.

FIGS. 3 and 4 show illustrative turbomachine components, such as hot gas path components of a turbomachine, in which teachings of the disclosure may be employed. FIG. 3 shows a perspective view of a turbine rotating blade 132 of the type in which embodiments of the present disclosure may be employed. Turbine rotating blade 132 includes a root 140 by which rotating blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotating blade 132 that intercepts the flow of working fluid 151 (FIG. 2), i.e., hot combustions gases, and induces the rotor disc to rotate. It will be seen that airfoil 150 of rotating blade 132 includes a concave pressure side (PS) outer wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blades 132 (FIG. 3) and platforms 148 (FIG. 3). Platforms 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structure that deliver coolant to a surface thereof for film cooling. Coolant may include, for example, air from compressor 102.

Embodiments of the disclosure described herein may include aspects applicable to either stationary nozzle 126, turbine rotating blade 132, other forms of turbomachine component, and/or any other industrial component that employs coupons. FIGS. 3 and 4 also show illustrative additively manufactured (AM) metal coupons 200 (hereafter "metal coupons 200" or "AM metal coupons(s) 200" for brevity) in a turbomachine component 202 (hereafter "component 202" for brevity). More particularly, metal coupons 200 may be in a coupon opening 204 in an airfoil body 206 of component 202. A "coupon opening 204 in body 206" may be any size void in body 206 up to an including a removed section of body 206, e.g., tip shroud. For example, metal coupons 200 can be in coupon openings 204 in trailing edges 158, 184 of blade 132 or nozzle 126, respectively. Alternatively, metal coupons 200 can be in coupon openings 204 in leading edges 156, 182 of blade 132 or nozzle 126, respectively. It is emphasized, however, that metal coupons 200 can be employed in any coupon opening 204 in an airfoil body 206 of component 202. Airfoil body 206 can include pressure side outer wall 152, 178, suction side outer wall 154, 180 and trailing edge 158, 184 for blade 132 or nozzle 126, respectively.

Figure 5:
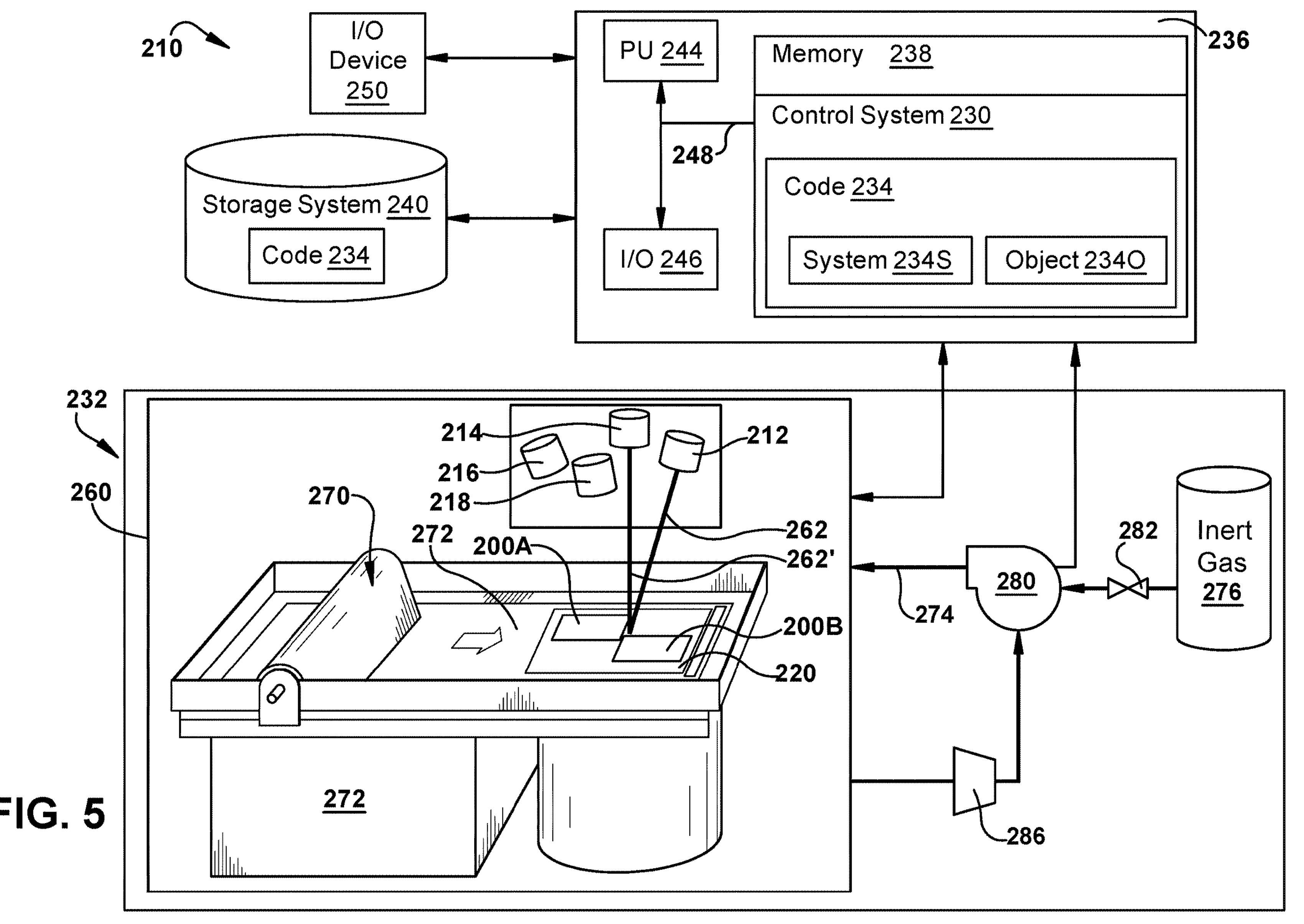
FIG. 5 shows a schematic block diagram of an illustrative additive manufacturing system for additively manufacturing a metal coupon according to embodiments of the disclosure.

Additively manufactured metal coupons 200 that include slanted coupon sidewall(s) and/or a slanted end wall, and one or more porous regions therein, may be additively manufactured using any now known or later developed technique capable of forming porous region(s). FIG. 5 shows a schematic/block view of an illustrative computerized metal powder additive manufacturing system 210 (hereinafter 'AM system 210') for generating metal coupon 200 or multiple metal coupons 200A, 200B, of which only a single layer is shown. The teachings of the disclosures will be described relative to building metal coupon 200 using multiple melting beam sources 212, 214, 216, 218, but it is emphasized and will be readily recognized that the teachings of the disclosure are equally applicable to build multiple coupons 200A, 200B using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon, a large variety of different coupons, and a large number of coupons on build platform 220.

AM system 210 generally includes an additive manufacturing control system 230 ("control system") and an AM printer 232. As will be described, control system 230 executes set of computer-executable instructions or code 234 to generate coupon(s) 200 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200. Code 234 can include, among other things, a set of computer-executable instructions 234S (herein also referred to as 'code 234S') for operating AM printer 232, and a set of computer-executable instructions 2340 (herein also referred to as 'code 2340') defining metal coupon(s) 200 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 2340 defining metal coupon(s) 200 may include a precisely defined 3D model of a coupon and can be generated from any of a large variety of well-known computer aided design (CAD) software systems such as AutoCAD®, TurboCAD®, DesignCAD 3D Max, etc. In this regard, code 2340 can include any now known or later developed file format. Furthermore, code 2340 representative of metal coupon(s) 200 may be translated between different formats. For example, code 2340 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 2340 representative of metal coupon(s) 200 may also be converted into a set of data signals and transmitted, received as a set of data signals and converted to code, stored, etc., as necessary. Code 2340 may be configured according to embodiments of the disclosure to allow for formation of border and internal sections in overlapping field regions, as will be described. In any event, code 2340 may be an input to AM system 210 and may come from a part designer, an intellectual property (IP) provider, a design company, the operator or owner of AM system 210, or from other sources. In any event, control system 230 executes code 234S and 2340, dividing metal coupon(s) 200 into a series of thin slices that assembles using AM printer 232 in successive layers of material.

AM printer 232 may include a processing chamber 260 that is sealed to provide a controlled atmosphere for metal coupon(s) 200 printing. A build platform 220, upon which metal coupon(s) 200 is/are built, is positioned within processing chamber 260. A number of melting beam sources 212, 214, 216, 218 are configured to melt layers of metal powder on build platform 220 to generate coupon(s) 200. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 2340. For example, in FIG. 5, melting beam source 212 is shown creating a layer of metal coupon(s) 200 using melting beam 262 in one region, while melting beam source 214 is shown creating a layer of metal coupon(s) 200 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (or re-coater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon (s) 200 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200, it will be recognized that component 202 may be manufactured in any now known or later developed manner such as additive manufacturing (perhaps similar to that described for metal coupon(s) 200), casting, or other methodology. Component 202 may include any of the material(s) listed herein for metal coupon(s) 200.

"Porosity," as used herein, is a ratio of open space volume to total volume of the stated structure, e.g., porous regions, metal coupon, etc. Typically, in this regard, porosity is stated as a percentage of volume of open space to overall or total volume of the stated structure. The open space is empty areas in a solid material and may be referred to herein as "pores" 302 and may include interconnecting passages in the material of the stated structure. A "porous region" in metal coupon 200 is thus less than 100% solid and includes open spaces in the form of pores 302 and/or interconnecting passages. Porous metal coupons 200 may include solid regions, but also include one or more porous regions that are less than 100% solid. As used herein, a three-dimensional boundary of a porous region or sub-region for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region. As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting coupon openings between pores 302 that may not be recognized as actual discrete pores (referred to herein as "pore connecting passages"). As one non-limiting example only, pore size can be in a range of, for example, $1.07\times10^{-6}$ to $8.58\times10^{-3}$ cubic millimeters ($6.54\times10^{-11}$ to $5.24\times10^{-7}$ cubic inches), or as another non-limiting example, the pore diameter can be in a range of 0.0127 millimeters (mm) to 0.254 mm (0.0005 inches to 0.01 inches). In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions or sub-regions. Note, the terms "region" and/or "sub-region" may be used interchangeably to denote changes in porosity. With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

Porous metal coupon(s) 200 can be formed with different porous regions with different porosities (which may or may not include one or more porous sub-regions with different porosities) using AM system 210 as described herein, or any other metal additive manufacturing system or method capable of forming porous metals. In terms of AM system 210 operation, melting beam sources 212, 214, 216, 218 can be programmed to intermittently not sinter metal, leaving metal powder rather than solid material. This process may include overlapping laser field regions by different amounts and/or designing pores 302 into a build file, i.e., code 2340. Less overlap of each laser scan creates more porosity, and more lasers overlap between successive scans creates less porosity. Laser spot size, scanning speed, focus and/or power can also be controlled to adjust porosity. More particularly, the additively manufacturing includes using AM system 210 having one or more melting beam sources 212, 214, 216, 218 to fuse together the layers of the metal powder and adjusting a parameter of the system to control the porosity of the at least two porous regions. The adjusting a parameter may include at least one of: adjusting an amount of overlap of a melting area of the one or more melting beam 262, 262' (FIG. 5) (from sources 212, 214, 216, 218); adjusting system scanning speed; or adjusting at least one of melting beam spot size, focus, or power. When the unmelted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of porous regions within any desired layers of metal coupon(s) 200.

FIGS. 6A-D show top-down schematic views of non-limiting sample metal coupons 200 having different porosities. Pores 302 are shown as darker open spaces in the drawings. FIG. 6A shows a sample metal coupon 200 having a first porosity of approximately 40% open space volume to total volume of the sample (with a generally high amount of open space and more or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

Figures 7A, 7B:
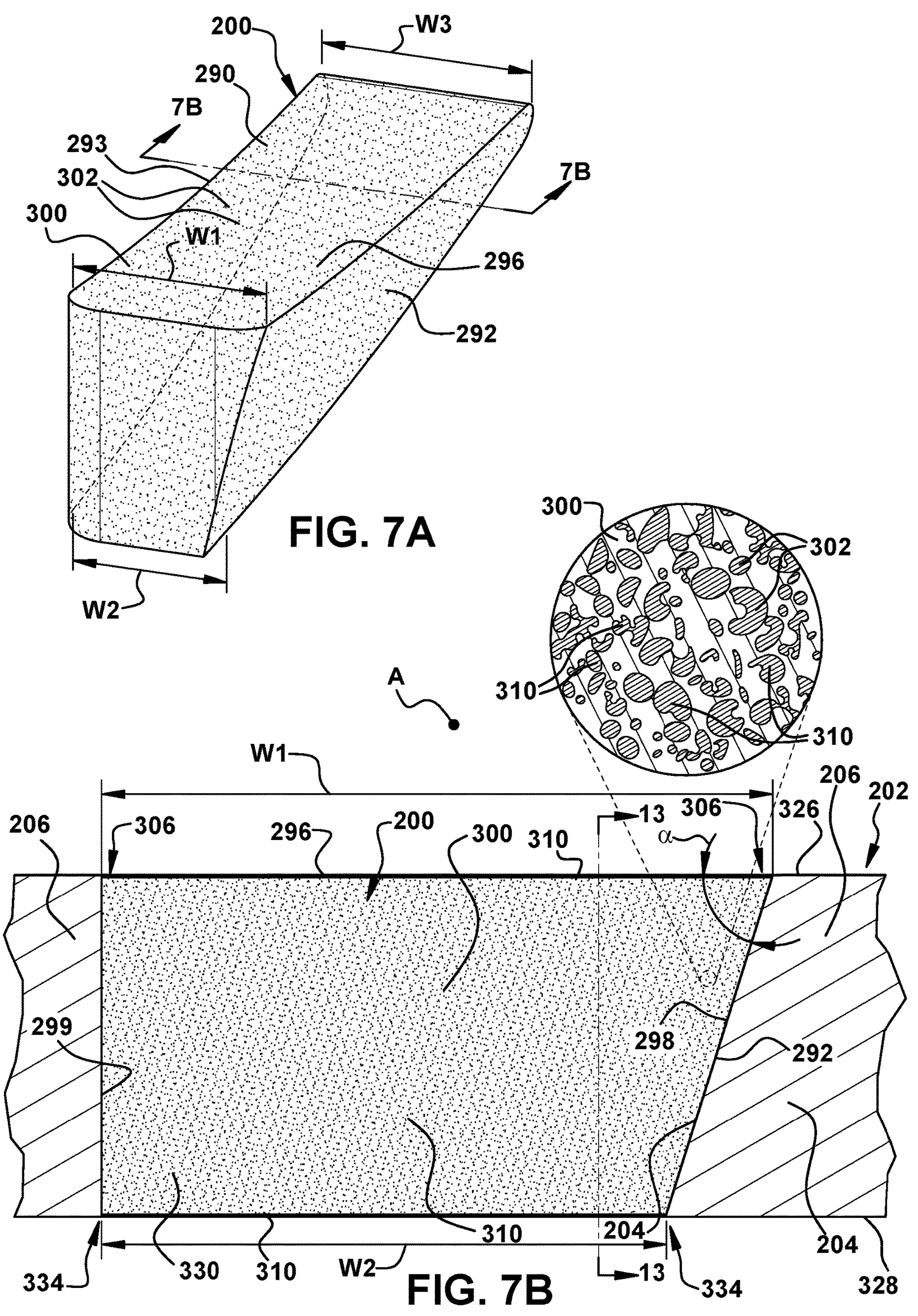
FIGS. 7A, 8A, 9A, 10A and 11A show perspective views of a metal coupon
FIGS. 7B, 8B, 9B, 10B and 11B show enlarged cross-sectional view of the respective metal coupons in a turbomachine component according to various embodiments of the disclosure.
Figures 8A, 8B:
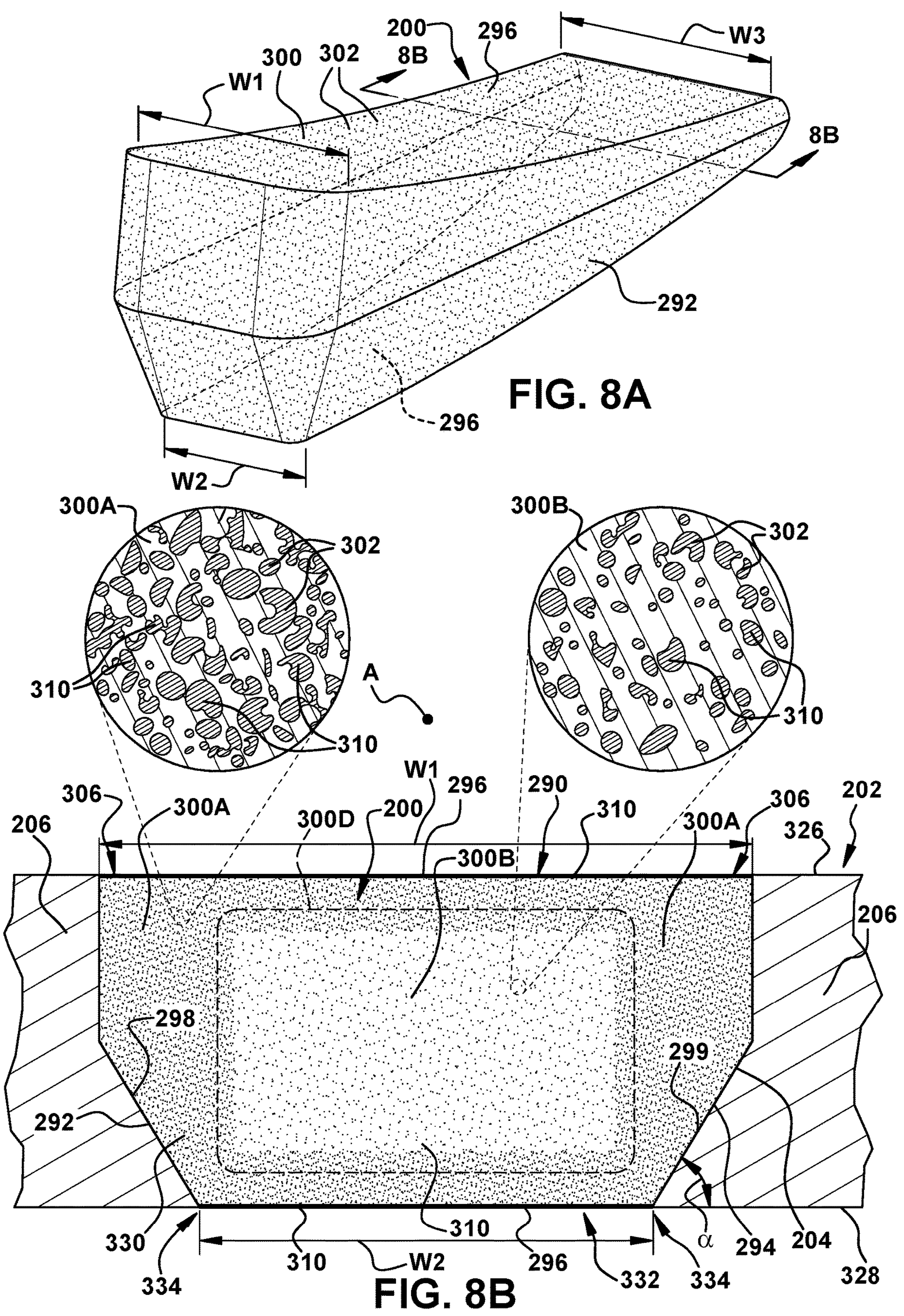
Figures 9A, 9B:
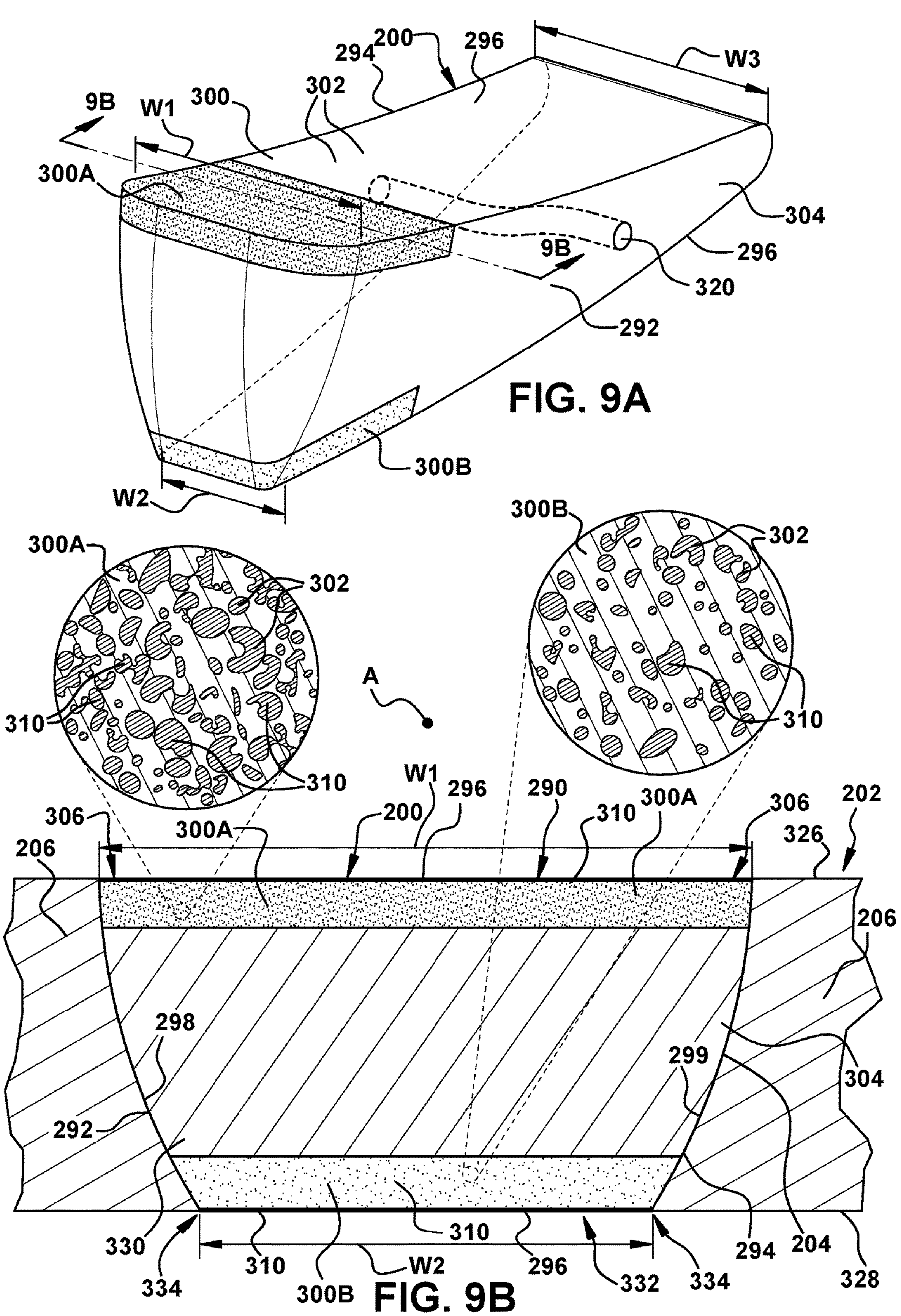
Figures 10A, 10B:
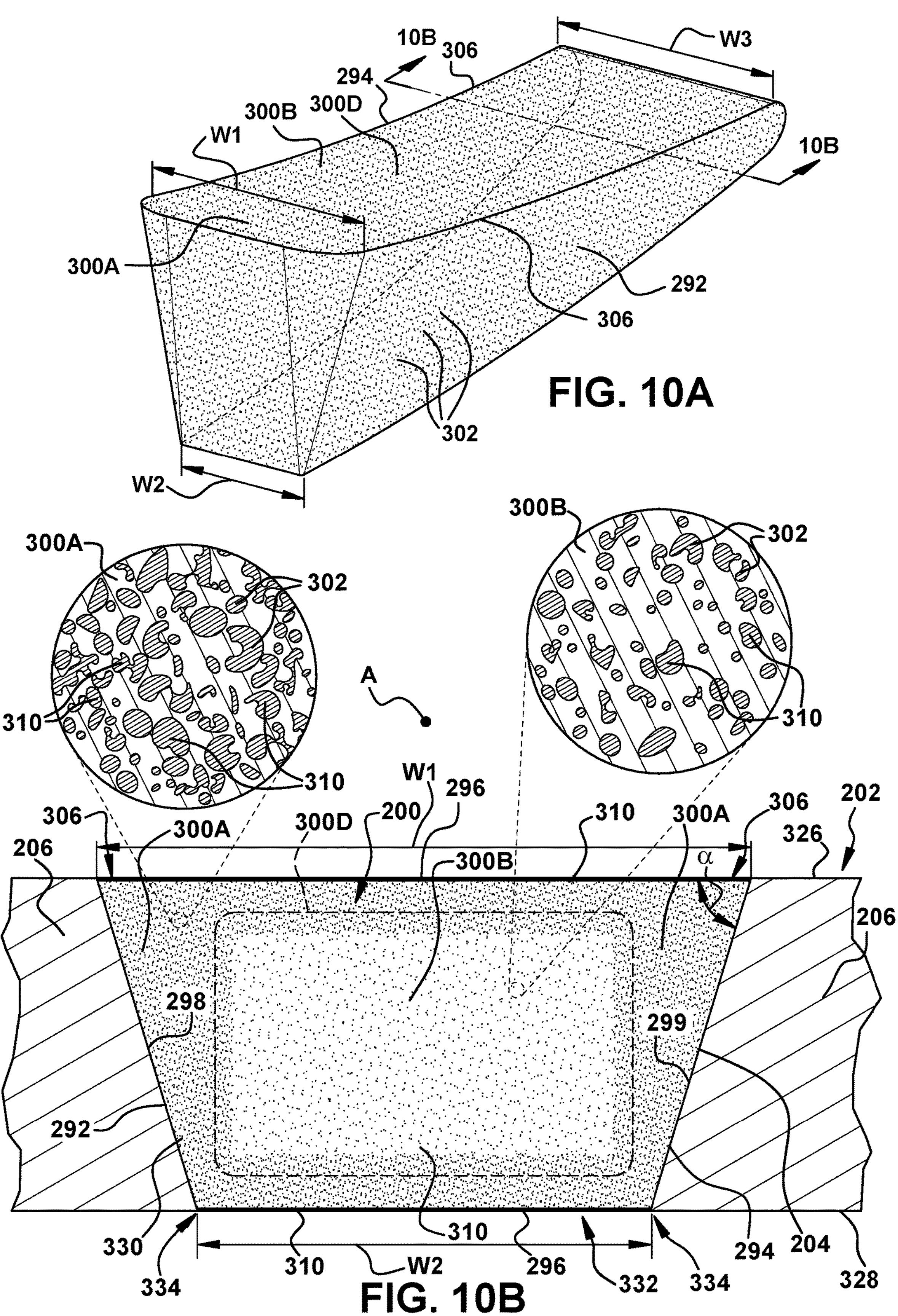
Figures 11A, 11B:
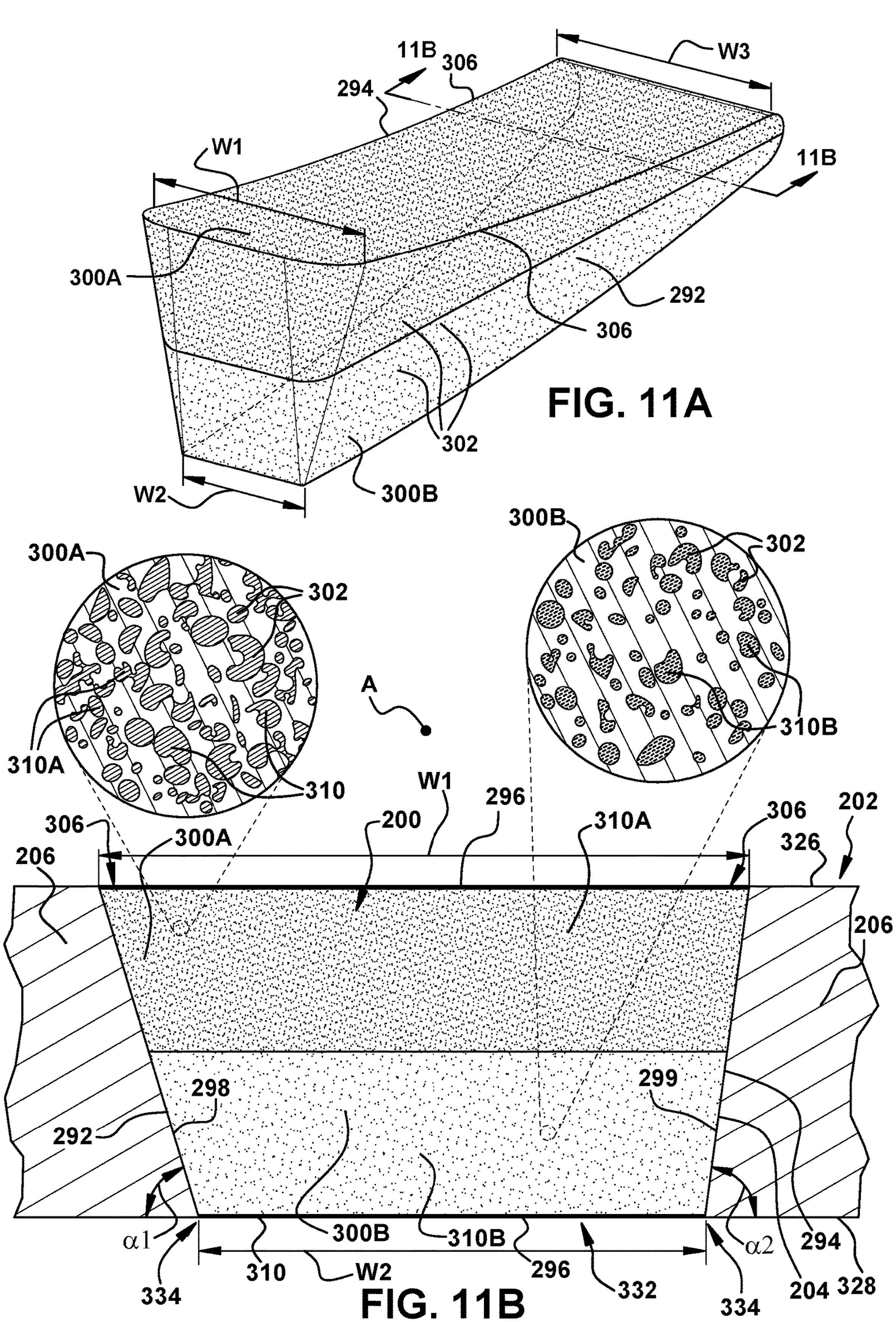

FIGS. 7A-B, 8A-B, 9A-B, 10A-B and 11A-B show perspective and cross-sectional views of an illustrative additively manufactured (AM) metal coupon 200 according to various embodiments. In FIGS. 7A-11B, the figures labeled 'A' show perspective views and those labeled 'B' show a cross-sectional view along view line B-B in the respective 'A' labeled figure but with the respective metal coupon 200 located in a coupon opening 204 of component 202. The drawings labeled 'B' also show metal coupon 200 and component 202 with turbomachine axis A running into and out of the page of the drawing. Metal coupon 200 includes an additively manufactured (AM) member 290 having at least one slanted coupon side wall at an angle $\alpha$ of less than 90° with an exterior surface of AM member 290, i.e., a surface that will be an exterior surface while metal coupon 200 is in component 202. AM metal member 290 also includes one or more porous regions 300 (with pores 302). FIG.A. 7A-B show metal coupon 200 with a single porous region 300 of a first porosity (entire coupon 200 has first porosity); FIGS. 8A-B show metal coupon 200 with more than one (layered) porous region 300A-B having different porosities; FIG. 9A-B show metal coupon 200 with one or more porous regions 300A-B having different porosities and a solid region 304; FIGS. 10A-B show metal coupon 200 with a variable porosity region 300D between (and perhaps including at least a portion of) first porous region 300A and second porous region 300B of different porosities; and FIGS. 11A-B show metal coupon 200 with more than one (opposing) porous region 300A-B having different porosities. Metal coupon 200 in FIGS. 7A-11B are shown having a shape configured to be positioned in, as shown in FIGS. 3 and 4, coupon opening 204 in trailing edge 158 or 184 of blade 132 or nozzle 126, respectively. However, coupon opening 204 can be in leading edge 156 or 182 of blade 132 or nozzle 126, respectively. Metal coupon 200 could also be in any tip (not shown) or airfoil section of blade 132 or platform 170 (shown), 174 or airfoil section of nozzle 126.

As shown FIGS. 7A-B, metal coupon 200 may have a first porous region 300 having a first porosity. In FIGS. 7A-B, metal coupon 200 includes a single porous region 300 with a single, first porosity. In FIGS. 7A-B, the entire metal coupon 200 includes first porosity. Hence, each layer of metal coupon 200 has the same porosity. In FIGS. 8A-B, 9A-B, 10A-B and 11A-B, metal coupon 200 includes two porous region 300A-B each with a different porosity. In FIGS. 8A-B, the two different porous regions 300A, 300B are layered internal and external regions with one being further inside metal coupon than the other, and in FIGS. 11A-B, two different porous regions 300A, 300B are in different sides (e.g., upper and lower sides as illustrated) of metal coupon 200. Areas within layers of metal coupon 200 that define porous regions 300A-B can be formed to include pores 302. In FIGS. 9A-B, metal coupon 200 includes porous regions 300A-B, each perhaps with the same or different porosity (latter shown), and a solid region 304. Here, areas within layers of metal coupon 200 that define regions 300A-B can be formed to include pores 302, and areas within layer of metal coupon 200 that define solid region 304 are formed without pores 302. In FIGS. 10A-B, metal coupon 200 includes variable porosity region 300D between (and perhaps including at least a portion of) first porous region 300A and second porous region 300B of different porosities. Here, areas within layers of metal coupon 200 that define regions 300A-B or variably porous region 300D can be formed to include pores 302, e.g., of different size or number, to create the different porosities. The variable porosity region 300D may have any porosity that changes, e.g., increases, decreases and/or both increases and decreases. The change in porosity may be gradual, or stepped or otherwise incremental. While variable porous region 300D is shown in FIGS. 10A-B between internal and external porous regions 300A, 300B as in FIGS. 8A-B, a variable porous region can also be applied to the embodiments illustrated in FIGS. 11A-B. Each porous region 300 may have a porosity between 2% to 50% open space volume to total volume of porous region 300, i.e., 2% to 50% open space with the other 50% to 98% solid. In other embodiments, each porosity may be between 10% to 40% open space volume to total volume of porous region 300, i.e., 10% to 40% open space with the other 60% to 90% solid. Other ranges of porosity are also possible. For example, porous regions 300 can have any porosity described throughout the current disclosure.

AM metal member 290 and metal coupon 200 may include at least one slanted coupon side wall 292 (and 294) each at an angle of less than 90° with an exterior surface 296 of AM metal member 290. The slanted coupon side wall(s) 292, 294 and exterior surface 296 may vary to provide different converging tapers that leverage the operational loads such as turbomachine aerodynamic loads from pressure differences and/or drag to retain metal coupon 200 within component 202, e.g., nozzle 126 or blade 132 trailing edge 158, 180.

In a first option, slanted coupon side wall(s) 292, 294 is/are at an angle of less than 90° with an exterior surface

296 of AM metal member 290 to provide a converging taper from a first part or side 326 of component 202 such as an airfoil pressure side outer wall 152, 178 (FIGS. 3-4) to a second part or side 328 of component 202 such as a suction side outer wall 154, 180 (FIGS. 3-4) of airfoil 150, 176. That is, oppositely slanted coupon side walls 292, 294 extend from pressure side outer wall 152, 178 to suction side outer wall 154, 180 of airfoil body 206. (FIGS. 7B, 8B, 9B, 10B, 11B only show sides 326, 328 for clarity). Here, the slanted coupon side wall(s) leverage the operational loads, e.g., turbomachine aerodynamic loads from pressure differences, to retain metal coupon 200 within component 202, e.g., nozzle 126 or blade 132 trailing edge 158, 184, respectively. In this regard, FIGS. 7A-B show AM metal member 290 with a single slanted coupon side wall 292, while FIGS. 8A-B, 9A-B, 10A-B and 11A-B show AM metal member 290 with a pair of oppositely slanted coupon side walls 292, 294. Each slanted coupon side wall 292, 294 is at an angle α of less than 90° with an exterior surface 296 of AM metal member 290 such as a first part or side 326 of component 202 such as (concave, pressure) side outer wall 152, 178 of airfoil 150, 176 and/or second part or side 328 of component 202 such as a second (convex, suction) side outer wall 154, 180 of an airfoil 150, 176. In contrast, a non-slanted coupon side wall 293 in FIGS. 7A-B is at an angle of about 90° with exterior surface 296 of AM metal member 290. Exterior surface 296 can be an exterior surface of metal coupon 200 that is not interfacing with coupon opening 204 in component 202. For example, as drawn in the 'B' figures, in this option, exterior surface 296 can be an upper surface, a lower surface or both upper and lower surfaces, of metal coupon 200 while in coupon opening 204 of component 202. That is, exterior surface 296 is an exterior surface while metal coupon 200 is in component 202. Where a pair of slanted coupon side walls 292, 294 are at angle α, both walls create a converging profile from first part or side 326 of component 202 such as (concave, pressure) side outer wall 152, 178 of airfoil 150, 176 to second part or side 328 of component 202 such as a second (convex, suction) side outer wall 154, 180 of an airfoil 150, 176. That is, a converging taper is provided from airfoil pressure side outer wall 152, 178 to suction side outer wall 154, 180. In this regard, width W1 of metal coupon 200 at or near side 326 (pressure side outer wall 152, 178) is greater than a width W2 at or near side 328 (suction side outer wall 154, 180). Regardless of the number of slanted coupon side walls, coupon opening 204 has mating inner wall(s) 298, 299 to match coupon slanted side wall(s) 292, 294.

The slanted coupon side walls 292, 294 converging taper from airfoil pressure side outer wall 152, 178 to suction side outer wall 154, 180 can take a variety of forms. In FIGS. 8A-B, slanted coupon side walls 292, 294 are slanted partly along a height of each coupon side wall 292, 294. Inner walls 298, 299 are similarly slanted partly along a height thereof. In FIGS. 9A-B, slanted coupon side walls 292, 294 are slanted along an entirety of height of each coupon side wall 292, 294 and may have a slight convex curvature. Inner walls 298, 299 are similarly slanted along an entirety of a height thereof and have a matching slightly concave curvature to that of couple side walls 292, 294. Any radius of curvature can be used in the FIGS. 9A-B embodiment so long as inner walls 298, 299 retain metal coupon 200 therein. In FIGS. 10A-B, slanted coupon side walls 292, 294 are slanted along an entirety of height of each coupon side wall 292, 294. Inner walls 298, 299 are similarly slanted along an entirety of a height thereof. In FIGS. 8A-B, 9A-B and 10A-B, slanted coupon side walls 292, 294 are slanted along an entirety of height of each coupon side wall 292, 294 at the same angle α relative to exterior surface 296 of metal coupon 200. Inner walls 298, 299 are similarly slanted along an entirety of a height thereof. However, matching angles on both side walls of metal coupon are not necessary. In FIGS. 11A-B, slanted coupon side walls 292, 294 are slanted along an entirety of height of each coupon side wall 292, 294, but coupon side wall 292 is at a different angle α1 relative to exterior surface 296 than coupon side wall 294 that is at angle α2, i.e., α1≠α2. Inner walls 298, 299 are similarly slanted along an entirety of a height thereof with matching angles to their interfacing coupon side wall 292, 294, respectively.

Figure 12A:
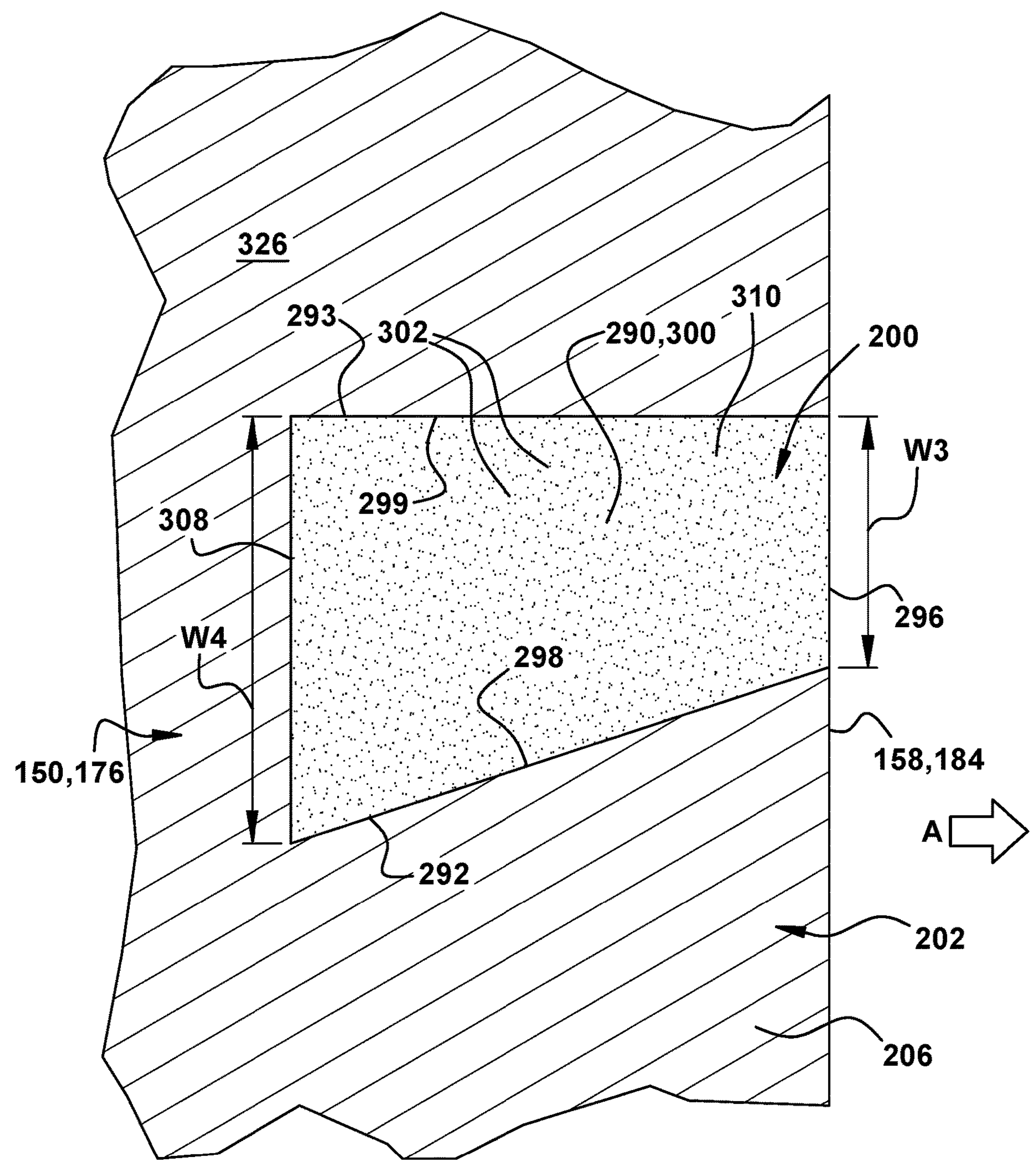
FIGS. 12A-B show side views of a metal coupon in a trailing edge of an airfoil body of a turbomachine component according to embodiments of the disclosure.
Figure 12B:
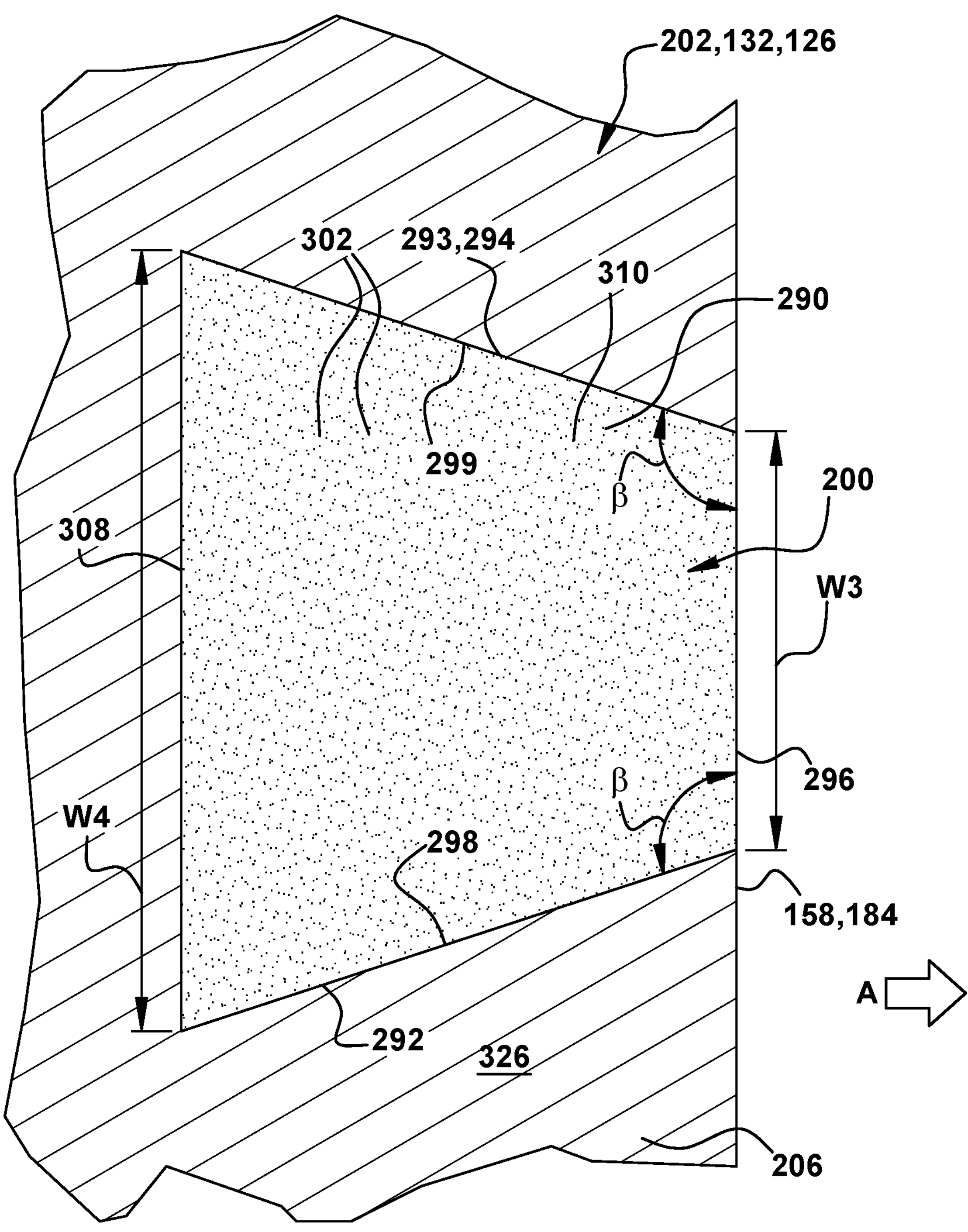

FIGS. 12A-B show side views of metal coupon 200 in component 202 in the form of an airfoil 150, 176 with trailing edge 158, 184. Arrow A for turbomachine axis A in FIGS. 12A-B points aft in turbomachine 100 (FIG. 1). In a second option, slanted coupon side wall(s) 292, 294 are at an angle β of greater than 90° with exterior surface 296 of AM metal member 290 at trailing edge 158, 184 (not sides 326, 328) of airfoil 150, 176. In this option, exterior surface 296 is trailing edge 158, 184 (not sides 326, 328) of airfoil 150, 176. FIG. 12A shows a single slanted coupon side walls 292 and FIG. 12B shows a pair of oppositely slanted coupon side walls 292, 294. A converging taper is provided from an upstream end 308 of metal coupon 200 to exterior surface 296 at trailing edge 158, 184. Oppositely slanted coupon side walls 292, 294 (where two are used) extend from upstream end 308 of metal coupon 200 to trailing edge 158, 184 of airfoil body 206. In other words, coupon slanted wall(s) 292, 294 (surfaces or faces) running parallel to turbomachine axis A (of rotor 112) are set with a converging taper from forward to aft. Width W3 at exterior surface 296 (trailing edge 158, 184) of metal coupon 200 is smaller than width W4 at upstream end 308 of metal coupon 200. The slanted coupon side wall(s) leverage the operational loads, e.g., turbomachine aerodynamic drag, to retain metal coupon 200 within the component 202, e.g., the nozzle or blade trailing edge. Where two coupon slanted side walls 292, 294 are used, angle β can be the same for both of them, or the can be different. In any event, coupon opening 204 has mating inner walls 298, 299 to match coupon slanted side wall(s) 292, 294 under the second option.

As apparent from the drawings, the two options for coupon slanted side wall(s) 292, 294 can be used together to leverage the operational loads in terms of both turbomachine aerodynamic loads from pressure differences and drag, to retain metal coupon 200 within component 202, e.g., nozzle or blade trailing edge.

Figure 13:
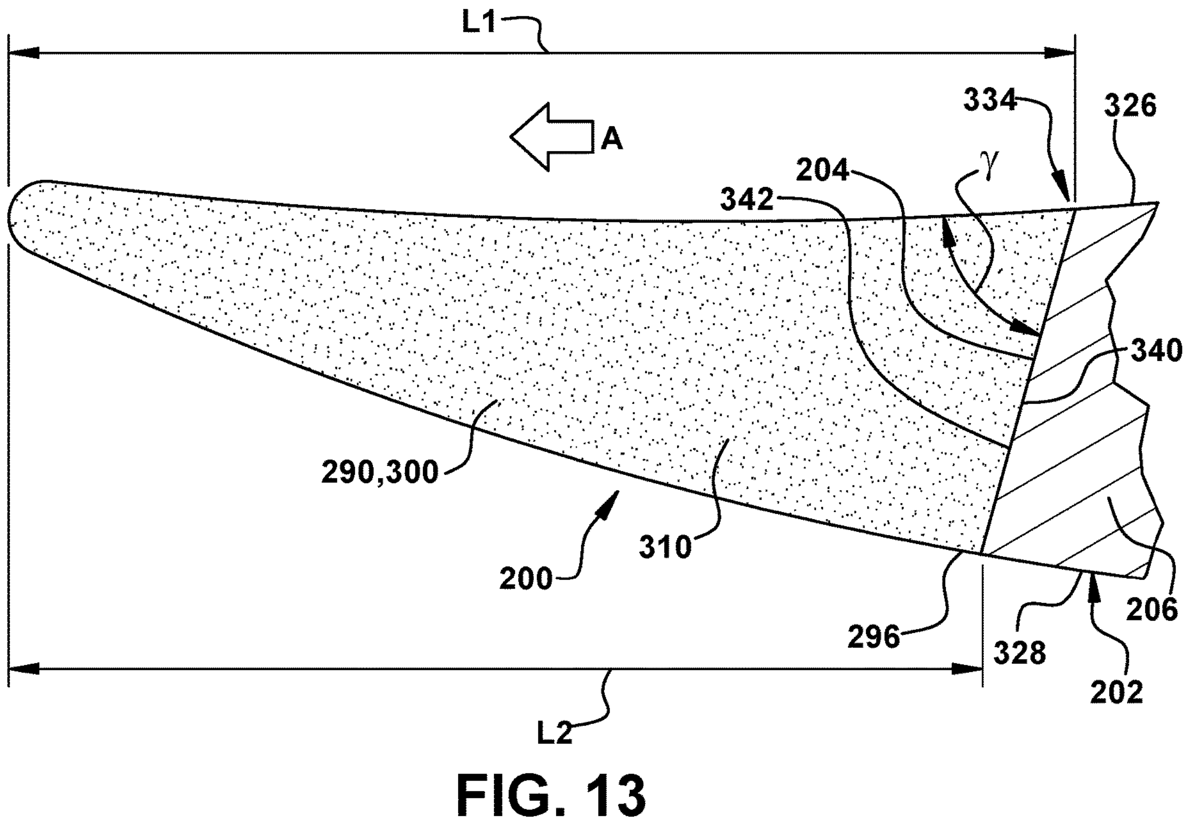
FIG. 13 shows a cross-sectional view along view line 13-13 in FIG. 7B of an optional slanted end wall for a metal coupon according to embodiments of the disclosure.

FIG. 13 shows a cross-sectional view along view line 13-13 in FIG. 7B. As shown in FIG. 13, AM metal member 290 may further include a slanted end wall 340 at an angle γ of less than 90° with exterior surface 296 of AM metal member 290 (metal coupon 200). Coupon opening 204 has a mating inner wall 342 to match coupon slanted end wall 340. Slanted end wall 340 and mating inner wall 342 of coupon opening 204 may further act to direct AM metal member 290 (metal coupon 200) into a desired position. Slanted end wall 340 and mating inner wall 342 of coupon opening 204 also leverage the operational loads in terms of both turbomachine aerodynamic loads from pressure differences and drag, to retain metal coupon 200 within component 202, e.g., nozzle or blade trailing edge. While slanted end wall 340 and mating inner wall 342 of coupon opening 204 are shown in the FIG. 7A embodiment, they are applicable to any embodiment herein. As shown in FIG. 13, slanted end wall 340 may result in a first length L1 of AM metal member 290 (metal coupon 200) on a first side 326, e.g., pressure side, being longer than a second length L2 of AM metal member 290 (metal coupon 200) on a second side 328, e.g., suction side.

Referring to FIGS. 3, 4, 5, 7A-11B, 12, 13 and 14A-E, embodiments of a method according to the disclosure will now be described. The method may include coupling a metal coupon in a turbomachine component 202. FIGS. 14A-F show perspective views of the method according to embodiments of the disclosure.

Figures 14A, 14B, 14C, 14D:
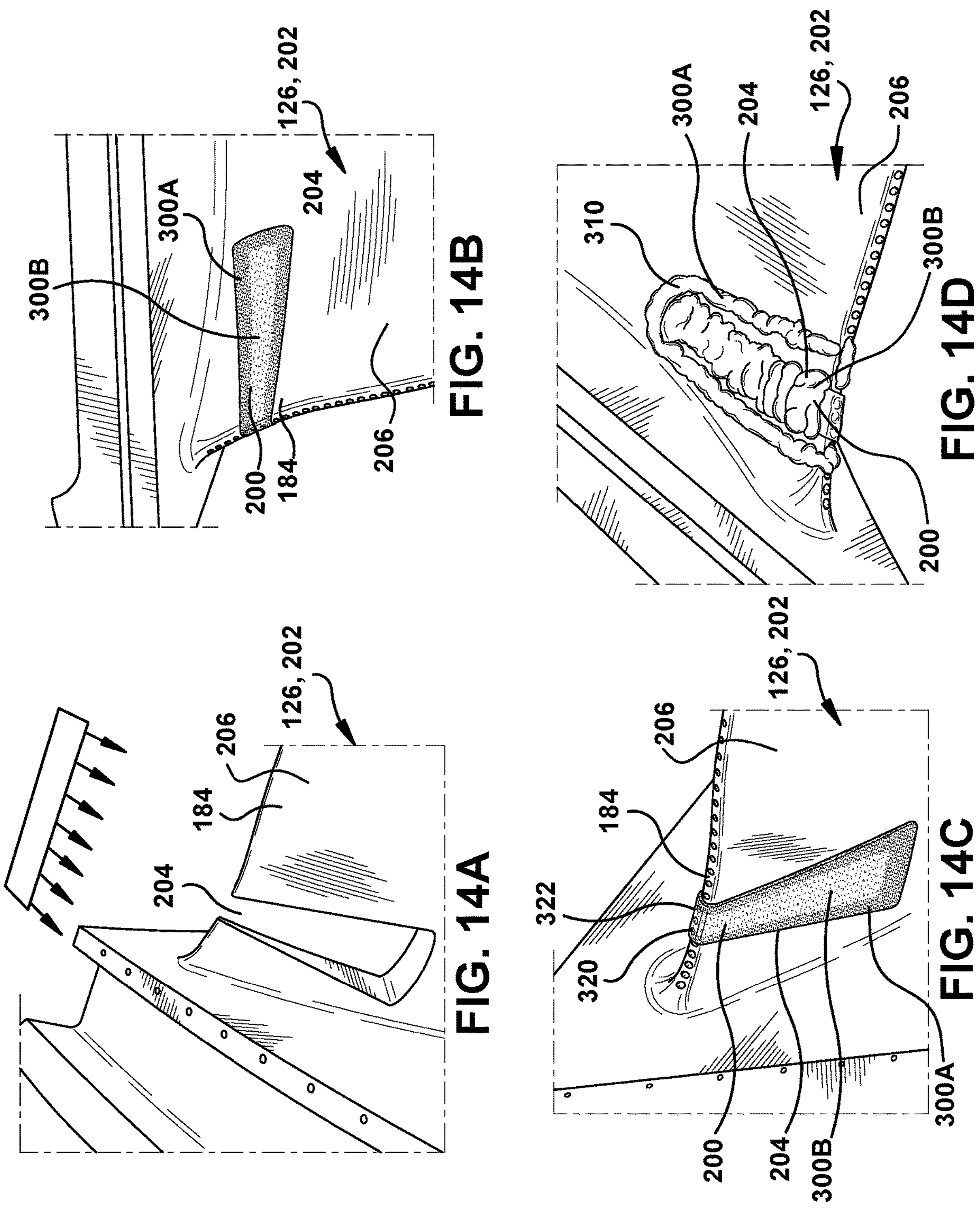
FIGS. 14A-F show perspective views of methods according to various embodiments of the disclosure.

FIG. 14A shows creating coupon opening 204 in airfoil body 206 of component 202. Coupon opening 204 is configured to receive metal coupon 200. Coupon opening 204 may have any shape desired. In certain applications, coupon opening 204 is created by removing a damaged part of airfoil body 206 of component 202, but coupon opening 204 can also be in an original version of component 202, e.g., at a location that is challenging to manufacture with the rest of component 202. In the non-limiting example shown, coupon opening 204 is in a trailing edge 184 of a nozzle 126. FIG. 14A also shows creating a model of coupon opening 204. The model creating may include using any now known or later developed three-dimensional scanner (not shown, see arrows) to scan and create a digitized representation of coupon opening 204 relative to airfoil body 206 of component 202. As the process of scanning and modeling a part is well known in the art, further details are omitted so the reader can focus on the salient aspects of the disclosure.

FIGS. 5, 8A-11B show additively manufacturing metal coupon 200 having a first porous region 300A having a first porosity and a second porous region 300B having a second porosity different than the first porosity. FIGS. 7A-B also shows forming metal coupon 200 with a single porosity (other than solid); and FIGS. 10A-B also shows forming metal coupon 200 with variable porosity region 300D between and perhaps including parts of first porous region 300A and second porous region 300B. Variable porosity region 300D may include a gradually changing porosity from that of first porous region 300A to that of second porous region 300B. As noted, the porosity change may be gradual, stepped or incremental. The first, second and variable porosity regions are different from each other in terms of at least one of the following characteristics: percentage of open space volume to total volume, pore shape, pore size, number of pores, or pore connecting passages. The additive manufacture may include any AM process described herein to manufacture porous metal coupon 200 (or dense or solid regions). The additive manufacturing may include selectively forming porous region(s) 300 among solid regions of metal coupon 200 by controlling AM printer 232. The additive manufacturing may include manufacturing metal coupon 200 to generally match profile (e.g., shape, dimension, etc.) of coupon opening 204, or to have a near net shape of coupon opening 204 based on the model of coupon opening 204. As used herein, "near net shape" indicates metal coupon 200 is within desired manufacturing tolerances with no or minimal additional processing, e.g., machining, at the specified stage of the manufacturing process. Some additional texturing or polishing to an exterior surface may be desired. It is recognized that additional coatings may be applied once metal coupon 200 is in a component. When formed to a near net shape, metal coupon 200 may also have a shape after manufacture that, when positioned in coupon opening 204, is very close to surface(s) of airfoil body 206 required to couple metal coupon 200 in coupon opening 204, e.g., with selected braze material(s) and no or minimal required finishing methods, like machining or grinding. The use of porous region(s) 300 in metal coupon 200, however, accommodates greater joint gap dimensional variance compared to solid coupons with narrow gaps for braze material because the porous regions provide improved braze material grasp and hold despite the larger gaps.

With regard to slanted coupon side wall options, as shown in FIGS. 7A-11B, the additive manufacturing may also include additive manufacturing includes forming metal coupon 200 with oppositely slanted coupon side walls 292, 294 extending from pressure side outer wall 152, 178 to suction side outer wall 154, 180 of airfoil body 206. In addition thereto or as alternative option, as shown in FIGS. 12A-B, the additive manufacturing may also include additive manufacturing includes forming metal coupon 200 with oppositely slanted coupon side walls 292, 294 extending from upstream end 308 of metal coupon 200 to the trailing edge 158, 184 of airfoil body 206. As another option, as shown in FIG. 13, the additive manufacturing may also include forming metal coupon 200 with a slanted end wall 340 at an angle γ of less than 90° with the exterior surface of the AM metal coupon, and wherein the coupon opening includes a mating inner wall to the slanted end wall.

While metal coupon 200 is shown additively manufactured as the FIG. 7B embodiment in FIGS. 14B-C, it may take any form described throughout the current disclosure.

In accordance with embodiments of the disclosure, porosity of one or more porous regions 300 in metal coupon 200 is controlled, i.e., customized, to control flow of braze material therein during a subsequent brazing process that couples metal coupon(s) 200 into, as shown in FIGS. 3, 4 and FIGS. 7B, 8B, 9B, 10B and 11B, coupon opening 204 in airfoil body 206 of component 202. Each porous region 300 may be customized in terms of any of the afore-described characteristics that impact porosity. In addition, a shape and/or location of porous regions 300 can be arranged to direct braze material as desired. For example, in FIGS. 7A-B, an entirety of metal coupon 200 includes first porous region 300 so braze material would be distributed uniformly therein. In contrast, in FIGS. 8A-B metal coupon 200 includes one porous region 300A near edge 306 of metal coupon 200 where it would couple with coupon opening 204 (FIGS. 3-4) and a different porous region 300B with a different porosity adjacent to first porous region 300A, e.g., distal from edge 306. In this manner, braze material 310 would be distributed in different manners in each porous region 300, resulting in different physical characteristic(s) of metal coupon 200 in different regions thereof. More particularly, any number of porous regions 300 can be used to customize (create) at least one physical characteristic in component 202 that includes metal coupon 200, such as: joint adhesive bond strength, coupon strength, stress/strain resistance, ductility, wear resistance, oxidation resistance, cycle fatigue, thermal conductivity, electrical conductivity, surface roughness, hardness, and/or mass. In a non-comprehensive list of possibilities, metal coupon 200 may include a higher porosity in one region 300 to direct more braze material therein through capillary action compared to other solid regions of metal coupon 200 to control at least one physical characteristic of component 202. In another embodiment, metal coupon 200 may include a lower porosity in one region 300 to direct less braze material therein through capillary action compared to other solid regions of metal coupon 200 to control at least one physical characteristic of component 202. In other embodiments, metal coupon(s) 200 may include two or more porous regions 300 that collectively make up an entirety of metal coupon 200.

Any arrangement of porous regions 300 is possible to create the desired braze material flow and infiltration.

In certain embodiments, the additive manufacturing may also include forming any variety of improvements for component 202 in metal coupon 200 including, for example, structures not previously present in component 202. Component 202 may be an original component in need of improvements or a component including a removed or damaged part. For example, as shown in FIG. 9A, the additive manufacture may optionally include forming a cooling passage 320 in metal coupon 200. Cooling passage 320 may extend in metal coupon 200 in any manner, e.g., in a serpentine path therein or extending through an external surface 322 of metal coupon 200. Any advantageous internal structural changes can be made in metal coupon(s) 200. Any now known or later developed post-additive manufacture finishing processing may be optionally performed on metal coupon(s) 200, e.g., abrading to smooth surfaces thereof. Advantageously, however, the teachings of the disclosure may remove the need for other finishing steps typically used to address residual stresses present in the material post additive manufacturing, e.g., peening, heat treatment, hot isostatic pressing (HIP), among others.

FIGS. 14B and 14C show positioning metal coupon 200 in coupon opening 204 in body 206 (e.g., an airfoil) of component 202. Metal coupon 200 may be positioned in opening 204 in body 206 in any now known or later developed manner, e.g., manually via a press fit or slip fit. Where necessary, metal coupon 200 may be held in place in any desired manner, e.g., adhesive, clamps, nickel-chromium tack welds, ball tacks, resistance weld, fusion tack weld, etc. Slanted coupon side wall(s) 292, 294 and/or slanted end wall 340 may be used to position metal coupon 200 in coupon opening 204 of airfoil body 206 of component 202.

Figure 14F:
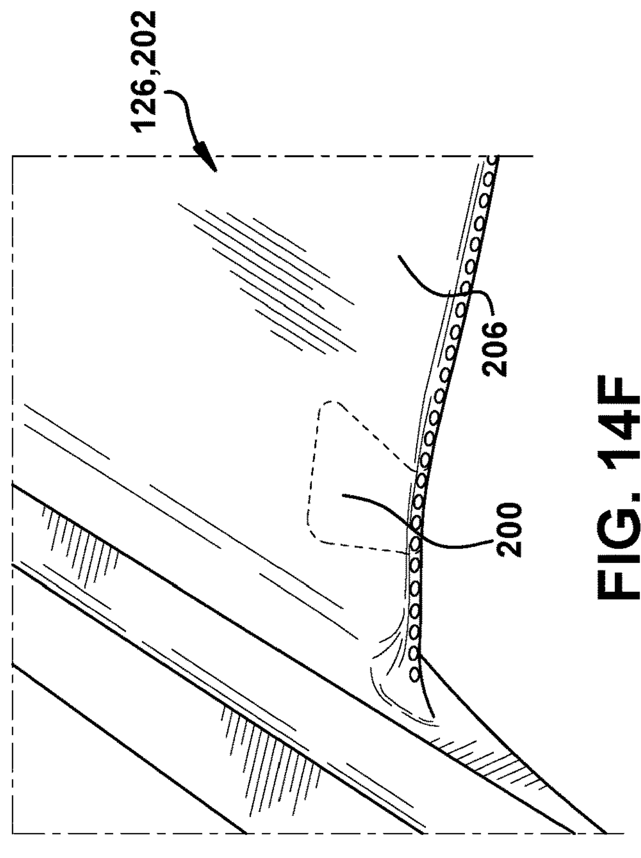
Figure 14E:
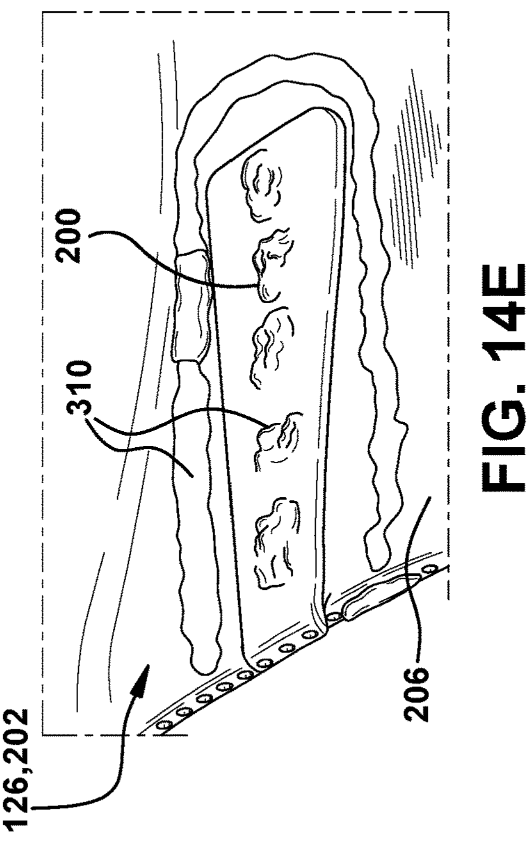

FIG. 14D-E shows infiltrating metal coupon 200 with a braze material 310 to couple the metal coupon in coupon opening 204 in airfoil body 206, i.e., performing a brazing process. Braze material 310 may include any now known or later developed brazing composition, such as but not limited to: GE (Alstom) B1P, Amdry™ D15, DF4B, or BRB, some the formulations of which are listed with other braze material formulations in the following table:

| Alloy | Ni | Cr | Co | B | Al | Ta | Y |
|---|---|---|---|---|---|---|---|
| Amdry ™ D15 | 65.10 | 15.30 | 10.30 | 2.30 | 3.50 | 3.50 | 0.00 |
| Amdry ™ BRB | 70.50 | 14.00 | 9.00 | 2.50 | 4.00 | 0.00 | 0.00 |
| Amdry ™ DF4B | 67.15 | 14.00 | 10.00 | 2.75 | 3.50 | 2.50 | 0.10 |

The infiltrating may include any now known or later developed brazing process such as using a vacuum brazing system, induction brazing system, and/or inert gas atmosphere heating system and related techniques. In one non-limiting example, the brazing may include, for example, applying the braze material (FIG. 14D) and applying heat (FIG. 14E) to cause it to flow into, through and around metal coupon 200 through capillary action.

The infiltrating injects braze material 310 into at least one of first porous region 300A based at least on a characteristic of the first porosity and second porous region 300B based at least on a characteristic of the second porosity. Where variable porosity region 300D (FIGS. 10A-B) is present, the infiltrating includes causing braze material 310 to travel through and infiltrate first porous region 300A based on the characteristic of the first porosity, travel through and infiltrate variable porosity region 300D based on a characteristic of variable porosity region 300D (e.g., gradient of the porosity, stepped porosity, among other things), and travel through and infiltrate second porous region 300B based on the characteristic of the second porosity.

The different porosities of porous regions 300A, 300B, and perhaps variable porosity region 300D, result in different braze material 310 flow and infiltration. As a result of the brazing process, first porous region 300A and second porous region 300B with braze material 310 therein have at least one different physical characteristic. Where variable porosity region 300D is present, it has perhaps different physical characteristic(s) than first and second porous regions 300A, 300B. Hence, as a result of the brazing process, first porous region 300A and second porous region 300B (and perhaps variable porous region 300D) with braze material 310 therein in component 202 have at least one different physical characteristic. For example, more braze material 310 may result in a stronger joint adhesive bond strength, higher ductility, higher thermal or electrical conductivity or higher oxidation resistance, and less braze material 310 may result in less surface roughness, less hardness, lower joint adhesive bond strength, lower ductility, lower thermal or electrical conductivity or lower oxidation resistance. In any event, controlling the amount of braze material and the porosity of the different porous regions allows controlling physical characteristics of the final product. In one example, the first porosity of first porous region 300A may be higher (i.e., less dense) than the second porosity of second porous region 300B. In this case, infiltrating includes infiltrating first porous region 300A with more braze material 310 than second porous region 300B. Depending on the braze material 310 used, among other factors, the different porosities allow for customization of at least one physical characteristic of component 202, such as: joint adhesive bond strength, stress/strain resistance, ductility, wear resistance, oxidation resistance, thermal conductivity, electrical conductivity, surface roughness, hardness, and/or mass. In addition, the multi-flow paths for braze material 310 using porous regions 300 may decrease the likelihood of a lack of fill and/or voids along a brazed joint compared to the conventional narrow gap-filling brazing process, and due to tight manufacturing tolerances required for narrow gap brazing. Hence, component 202 may be at least 98% solid despite the use of metal coupon 200 with porous region(s) 300 therein.

In certain embodiments, different braze materials 310 may be used in different parts of metal coupon(s) 200, providing further customization of the coupling of metal coupon(s) 200 in component 202 and physical characteristics of regions of component 202. For example, referring to FIGS. 9B and 11B, a first braze material 310A may be used on a first part or side 326 of component 202 and another braze material 310B, different than first braze material 310A, may be used on a different part or side 328 of component 202. In one example, referring to FIGS. 3, 4 and 9B, first part or side 326 of component 202 may be a first (concave, pressure) side outer wall 152, 178 of airfoil 150, 176 and second or side 328 of component 202 may be a second (convex, suction) side outer wall 154, 180 of an airfoil 150, 176. The different braze materials 310A, 310B, in addition to different porous regions 300, on the different part or sides 326, 328 can be customized for the anticipated environment of component 202 at those locations. As will be recognized, the variations of braze materials and/or porous regions possible to address different situations are immense.

Other embodiments of a method according to the disclosure may include just forming metal coupon 200 for component 202. In this case, as shown in FIG. 14A, the method includes creating a model of coupon opening 204 in airfoil body 206 of component 202, and additively manufacturing metal coupon 200 to at least closely fit coupon opening 204, e.g., with a near net shape of coupon opening 204. As described herein and shown in FIGS. 8A-B, 9A-B, 10A-B, 11A-B, metal coupon 200 may include at least one slanted side wall 292, 294 and/or slanted end wall 340, first porous region 300A having a first porosity and second porous region 300B having a second porosity different than the first porosity. The different first and second porosities create different physical characteristics after coupling of metal coupon 200 in coupon opening 204 using braze material(s) 310.

FIG. 14F shows illustrative optional finishing steps for component 202, such as but not limited to machining to smooth exterior surfaces and remove excess braze material. As noted, the teachings of the disclosure remove the need for other finishing steps, e.g., peening, heat treatment, hot isostatic pressing (HIP), among others.

FIGS. 3, 4, 7B, 8B, 9B, 10B, 11B, 12A-B and 13 show embodiments of turbomachine component 202 according to embodiments of the disclosure. FIGS. 7B, 8B, 9B, 10B, 11B, as noted, show enlarged cross-sectional views of metal coupon 200 on coupon opening 204 of airfoil body 206 of component 202. FIG. 7B shows component 202 with metal coupon 200 with a single porous region 300, FIG. 8B shows component 202 with metal coupon 200 having two or more porous regions 300A, 300B, FIG. 9B shows component 202 with metal coupon 200 having two or more porous regions 300A, 300B and a solid region 304 (FIG. 9A), FIG. 10B shows component 202 with metal coupon 200 having two or more layered porous regions 300A, 300B and different braze materials 310A, 310B, and FIG. 11B shows component 202 with metal coupon 200 having two porous regions 300A, 300B on different sides 326, 328 of metal coupon 200 and different braze materials 310A, 310B. Component 202 includes airfoil body 206 having pressure side outer wall 152, 178, suction side outer wall 154, 180 and trailing edge 158, 184. In the examples used herein, airfoil body 206 may include a turbine rotating blade 132 (FIG. 3) or a turbine stationary nozzle 126 (FIG. 4). While metal coupon 200 is shown in, for example, an airfoil 150, 176 of blade 132 and nozzle 126 in FIGS. 3 and 4, respectively, metal coupon 200 can be in any part of airfoil body 206 of component 202. Additively manufactured (AM) metal coupon 200 may include any option(s) of oppositely slanted coupon side walls 292, 294 each at an angle of less than 90° with an exterior surface 296 thereof, as described herein. As described herein relative to FIGS. 8A-11B, AM metal coupon 200 also has at least first porous region 300A having a first porosity and a second porous region 300B having a second porosity different than the first porosity. Braze material 310 couples metal coupon 200 in coupon opening 204 in airfoil body 206. As shown in FIG. 7B, braze material 310 includes a first section 330 infiltrated into first porous region 300A based at least on a characteristic of the first porosity. As shown in FIGS. 8B, 9B, 10B and 11B, metal coupon 200 further includes second porous region 300B having a second porosity different than the first porosity. The first porosity may be different from the second porosity in terms of at least one of the following characteristics: percentage of open space volume to total volume, pore shape, pore size, number of pores, or pore connecting passages. Airfoil body 206 may have a third porosity different than one or both of the first porosity and second porosity. For example, airfoil body 206 may have a third porosity denser than both first porosity and second porosity, e.g., it can be 100% solid. Optionally, metal coupon 200 may include a variable porosity region 300D (shown by dashed boxes in FIG. 10B) between (and possibly including part of) first porous region 300A and second porous region 300B. The variable porosity region 300D may gradually change porosity between first and second porosities, e.g., in a stepped or incremental manner. In FIG. 10B, the different porous regions 300A, 300B are layered, one inside the other in metal coupon 200. In FIG. 11B, the different porous regions 300A, 300B are on opposite sides of metal coupon 200.

In FIGS. 10B and 11B, braze material 310B includes a second section 332 infiltrated into second porous region 300B based at least on a characteristic of the second porosity. "At least on a characteristic" of the porosity indicates the porosity can result in different infiltration characteristics, such as braze material volume, pattern within the porosity, crystallization, chemistry gradients and composition, among other characteristics. However, as understood in the art, other factors can also impact the infiltration characteristics such as the type of braze material and characteristics of the brazing process such as but not limited to: temperature, pressure, positioning of component 202 and metal coupon 200. The consequence of the different porosities is that first porous region 300A and second porous region 300B with braze material(s) 310 therein have at least one different physical characteristic. The porosities can be customized to select those physical characteristics inasmuch as the porosities can impact those physical characteristics. In one example, the first porosity of first porous region 300A may be higher (i.e., less dense) than the second porosity of second porous region 300B and first porous region 300A includes more braze material 310 therein than second porous region 300B. In another example, shown in FIG. 10B, first porous region 300A is in at least part of edge 306 of metal coupon 200 configured for joining to airfoil body 206, while second porous region 300B is farther inside metal coupon 200. In another example, shown in FIG. 11B, first porous region 300A is in one side 326 of metal coupon 200 and second porous region 300B is in an opposite side 328 of metal coupon 200. In this manner, different sides of metal coupon 200 and component 202 may have different physical characteristics. In terms of airfoils 150, 176 of nozzles 126 or blades 132, as shown in FIGS. 3 and 4, a pressure side outer wall 152, 178 of the airfoil may have different physical characteristics than a suction side outer wall 154, 180 of the airfoil, respectively. In any event, second porous region 300B may be adjacent to first porous region 300A. Alternatively, second porous region 300B may also be adjacent at least (another) part of edge 306 of metal coupon 200, and perhaps adjacent first porous region 300A. This arrangement, as shown in FIG. 10B, may be advantageous to place more braze material 310 near a braze joint 334 to strengthen the joint adhesive bond strength of metal coupon 200 in coupon opening 204 in airfoil body 206, or it may allow for less oxidation at braze joint 334 or greater thermal conductivity at braze joint 334. Any of the physical characteristics described herein can also be customized based on the different porosities and/or different braze materials. As noted, depending on the braze material 310 used, the different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass.

In FIG. 11B, braze material 310B also includes second section 332 infiltrated into second porous region 300B based at least on a characteristic of the second porosity. In the FIG. 11B example, first porous region 300A is in one side 326 of metal coupon 200 and second porous region 300B is in opposite side 328 of metal coupon 200. In this manner, different sides of metal coupon 200 and component 202 may have different physical characteristics. In terms of airfoils 150, 176 of nozzles 126 or blades 132, as shown in FIGS. 3 and 4, a pressure side outer wall 152, 178 of the airfoil may have different physical characteristics than a suction side outer wall 154, 180 of the airfoil, respectively. In any event, second porous region 300B may be adjacent to first porous region 300A. This arrangement, as shown in FIG. 11B may be advantageous to place more braze material 310 near a braze joint 334 on side 326 to strengthen the joint adhesive bond strength of metal coupon 200 in coupon opening 204 in airfoil body 206, or it may allow for less oxidation at braze joint 334 or greater thermal conductivity at braze joint 334. Any of the physical characteristics described herein can also be customized based on the different porosities and/or different braze materials. As noted, depending on the braze material 310 used, the different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass.

As noted, metal coupon 200 may have a near net shape of coupon opening 204 in airfoil body 206 of component 202. As shown in FIG. 14C, metal coupon 200 may optionally include cooling passage(s) 320 therein. Cooling passage(s) 320 are defined in metal coupon 200 and may extend through external surface 322 of the metal coupon.

While particular locations of different porous regions 300 have been illustrated herein, it is emphasized that the different porous regions can be arranged in any manner to provide different braze material infiltration characteristics and different physical characteristics for component 202.

Embodiments of the disclosure may also include, as shown in FIGS. 1-2, turbomachine 100 including turbine assembly 110, and at least one component 202, as described herein.

Component(s) 202 may take the form turbine stationary nozzle(s) 126, turbine rotating blade(s) 132 or other components of turbomachine 100. Metal coupon 200 can be used in a newly manufactured component or in a component in need of repair or improvements. It is noted that while the method is shown applied to an airfoil, component 202 could be any industrial component.

The disclosure provides various technical and commercial advantages, examples of which are discussed herein. For repairs or improvements of components, additive manufacturing allows cost-effective creation of metal coupons with custom-fitted shapes where only damaged material needs to be removed. Porous region(s) may provide a higher percentage of a base metal alloy (e.g., >60%) in certain areas that may result in improved physical characteristics compared to, e.g., pre-sintered preforms. Porous regions may also provide a welded/fused particle matrix (e.g., with a superalloy metal base) with braze material fill which is stronger compared to conventional metal particles surrounded by braze material. Multi-flow paths for the braze material using porous regions may also decrease the likelihood of a lack of fill and/or voids along a brazed joint compared to the conventional narrow gap-filling brazing process. Porous regions can be formed with differences in porosity across metal coupon to allow for highly customized braze material flow. Porous regions also accommodate greater joint gap dimensional variance compared to machined solid coupons with narrow gaps for braze material. Repairs using the teachings of the disclosure are stronger than traditional narrow gap brazing processes, do not require certain post-repair finishing, yet provide improved physical characteristics compared to current techniques, such as pre-sintered preforms (PSPs). The slanted coupon side wall(s) and/or slanted end wall leverage the operational loads, e.g., turbomachine aerodynamic loads from pressure differences and drag, to retain the metal coupon within the component, e.g., nozzle or blade trailing edge.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A metal coupon for repairing a component, comprising:

an additively manufactured (AM) metal member having:

at least one slanted coupon side wall at an angle of greater than 90° with an exterior surface of the AM metal member, wherein a width of the AM metal member at the exterior surface of the AM metal member is smaller than a width of the AM metal member at an interior surface of the AM metal member opposed to the exterior surface thereof responsive to the AM metal member being inserted into a coupon opening in the component with the exterior surface of the AM metal member flush with at least one an outer wall, a trailing edge, and a leading edge of the component and the interior surface of the AM metal member interfacing with the coupon opening in the component; and wherein the coupon opening includes at least one slated coupon opening side wall mating with the at least one slanted coupon side wall;

a first porous region having a first porosity; and a second porous region having a second porosity different than the first porosity, wherein the first porosity and the second porosity are each between 21% to 50% open space volume to total volume of the first porous region and second porous region, respectively.

2. The metal coupon of claim 1, wherein the AM metal member includes a variable porosity region between the first porous region and the second porous region.

3. The metal coupon of claim 1, wherein the AM metal member further includes a slanted end wall at an angle of less than 90° with the exterior surface of the AM metal member as measured from a pressure side thereof into the AM metal member.

4. The metal coupon of claim 1, wherein the first porosity and the second porosity are between 21% to 40% open space volume to total volume of the respective porous region.

5. The metal coupon of claim 1, wherein the at least one slanted coupon side wall includes a pair of oppositely slanted coupon side walls.

6. A turbomachine component, comprising:

an airfoil body having a pressure side, a suction side and a trailing edge;

an additively manufactured (AM) metal coupon having oppositely slanted coupon side walls each at an angle of greater than 90° with an exterior surface of the AM metal coupon, a first porous region having a first porosity, and a second porous region having a second porosity different than the first porosity, wherein a width of the AM metal coupon at the exterior surface of the AM metal coupon is smaller than a width of the AM metal coupon at an interior surface of the AM metal coupon opposed to the exterior surface thereof responsive to the AM metal coupon being inserted into a coupon opening in the component with the exterior surface of the AM metal coupon flush with at least one of an outer wall, the trailing edge, and a leading edge of the component and the interior surface of the AM metal coupon interfacing with the coupon opening in the component, and the first porosity and the second porosity are each between 21% to 50%; and a braze material coupling the AM metal coupon in a coupon opening in the airfoil body, the braze material infiltrated into at least one of the first porous region based at least on a characteristic of the first porosity and the second porous region based at least on a characteristic of the second porosity, wherein the coupon opening includes oppositely slanted coupon opening side walls mating with the oppositely slanted coupon side walls.

7. The turbomachine component of claim 6, wherein the AM metal coupon further includes a slanted end wall at an angle of less than 90° with the exterior surface of the AM metal coupon as measured from a pressure side thereof into the AM member, and the coupon opening includes a mating inner wall to the slanted end wall.

8. The turbomachine component of claim 6, wherein the oppositely slanted coupon side walls extend from the pressure side to the suction side of the airfoil body.

9. The turbomachine component of claim 6, wherein the oppositely slanted coupon side walls extend from an upstream end of the metal coupon to the trailing edge of the airfoil body.

10. The turbomachine component of claim 9, wherein the oppositely slanted coupon side walls extend from the pressure side to the suction side of the airfoil body.

11. The turbomachine component of claim 6, wherein the AM metal coupon includes a variable porosity region between and including at least a portion of the first and second porous regions.

12. The turbomachine component of claim 6, wherein the first porosity is higher than the second porosity and the first porous region includes more of the braze material therein than the second porous region.

13. The turbomachine component of claim 6, wherein the first porous region is in at least part of an edge of the metal coupon configured for joining to the airfoil body, and the second porous region is adjacent to the at least part of the first porous region.

14. The turbomachine component of claim 6, wherein the first porosity and the second porosity are each between 21% to 40% open space volume to total volume of the first porous region and second porous region, respectively.

15. A method of coupling a metal coupon in a turbomachine component having an airfoil body having a pressure side, a suction side and a trailing edge, the method comprising:

additively manufacturing the metal coupon with oppositely slanted coupon side walls each at an angle of greater than 90° with an exterior surface of the metal coupon, a first porous region having a first porosity, and a second porous region having a second porosity different than the first porosity, wherein a width of the metal coupon at the exterior surface of the metal coupon is smaller than a width of the metal coupon at an interior surface of the metal coupon opposed to the exterior surface thereof responsive to the metal coupon being inserted into a coupon opening in the component with the exterior surface of the metal coupon flush with at least one of an outer wall, the trailing edge, and a leading edge of the component and the interior surface of the metal coupon interfacing with the coupon opening in the component, and the first porosity and the second porosity are each between 21% to 50%;

positioning the metal coupon in the coupon opening in the airfoil body of the component, wherein the coupon opening includes oppositely slanted coupon opening side walls mating with the oppositely slanted coupon side walls; and infiltrating the metal coupon with a braze material to couple the metal coupon in the coupon opening in the airfoil body, wherein the infiltrating includes infiltrating the braze material into at least one of the first porous region based at least on a characteristic of the first porosity and the second porous region based at least on a characteristic of the second porosity.

16. The method of claim 15, wherein the additive manufacturing includes forming the metal coupon with a slanted end wall at an angle of less than 90° with the exterior surface of the metal coupon as measured from a pressure side thereof into the metal coupon, and wherein the coupon opening includes a mating inner wall to the slanted end wall.

17. The method of claim 15, wherein the additive manufacturing includes forming the metal coupon with the oppositely slanted coupon side walls extending from the pressure side to the suction side of the airfoil body.

18. The method of claim 15, wherein the additive manufacturing includes forming the metal coupon with the oppositely slanted coupon side walls extending from an upstream end of the metal coupon to the trailing edge of the airfoil body.

19. The method of claim 18, wherein the additive manufacturing further includes forming the oppositely slanted coupon side walls extending from the pressure side to the suction side of the airfoil body.

20. The method of claim 15, further comprising, prior to the additive manufacturing:

creating the coupon opening in the airfoil body configured to receive the metal coupon; and creating a model of the coupon opening, wherein the additive manufacturing includes manufacturing the metal coupon based on the model of the coupon opening.

* * * * *